United States Patent
Hiroshima

(10) Patent No.: US 8,773,347 B2
(45) Date of Patent: Jul. 8, 2014

(54) ELECTRO-OPTICAL DEVICE, ELECTRONIC APPARATUS AND PROJECTION DISPLAY DEVICE

(75) Inventor: Yasushi Hiroshima, Tatsuno-machi (JP)

(73) Assignee: Seiko Epson Corporation, Tokyo (JP)

( * ) Notice: Subject to any disclaimer, the term of this patent is extended or adjusted under 35 U.S.C. 154(b) by 596 days.

(21) Appl. No.: 12/964,960

(22) Filed: Dec. 10, 2010

(65) Prior Publication Data

US 2011/0141157 A1 Jun. 16, 2011

(30) Foreign Application Priority Data

Dec. 15, 2009 (JP) ................................ 2009-283742

(51) Int. Cl.
G09G 3/36 (2006.01)

(52) U.S. Cl.
USPC ........................................... 345/101; 345/89

(58) Field of Classification Search
CPC ................... G02F 2203/60; G09G 2320/0285; G09G 2320/041; G09G 3/2022; G09G 3/3648
USPC ................. 345/87, 89, 99, 101, 204, 690
See application file for complete search history.

(56) References Cited

U.S. PATENT DOCUMENTS

| | | | |
|---|---|---|---|
| 5,694,147 A * | 12/1997 | Gaalema et al. | 345/101 |
| 6,774,883 B1 * | 8/2004 | Muhlemann | 345/101 |
| 7,502,092 B2 | 3/2009 | Park et al. | |
| 2003/0142055 A1 * | 7/2003 | Iisaka | 345/89 |
| 2008/0231587 A1 * | 9/2008 | Takahashi | 345/101 |
| 2009/0102774 A1 | 4/2009 | Hattori | |
| 2010/0039441 A1 | 2/2010 | Okuyama et al. | |

FOREIGN PATENT DOCUMENTS

| JP | 02-0263127 A | 10/1990 |
|---|---|---|
| JP | 8-029265 A | 2/1996 |
| JP | 09-005713 A | 1/1997 |
| JP | 2001-100180 A | 4/2004 |
| JP | 2005-308676 A | 11/2005 |
| JP | 2006-018284 A | 1/2006 |
| JP | 2008-083216 A | 4/2008 |
| JP | 2008-233738 A | 10/2008 |
| JP | 2008-256821 A | 10/2008 |
| JP | 2009-103780 A | 5/2009 |
| JP | 2010-044296 A | 2/2010 |

* cited by examiner

*Primary Examiner* — Regina Liang

(74) *Attorney, Agent, or Firm* — ALG Intellectual Property, LLC

(57) ABSTRACT

An electro-optical device includes an element substrate having a temperature detection conductive film formed by doping with an impurity in the same semiconductor layer as a semiconductor layer of transistor; and a driving portion for supplying a driving signal, wherein the driving portion includes a data conversion portion for converting image data and generating, as the driving signal, a digital driving signal made of an ON-voltage in which the brightness of the pixel is saturated and an OFF-voltage in which the pixel becomes a light-off state in each of a plurality of subfields in which a field period is divided on a time axis, and the data conversion portion performs a correction corresponding to a change in resistance in the temperature detection conductive film when generating the digital driving signal.

16 Claims, 14 Drawing Sheets

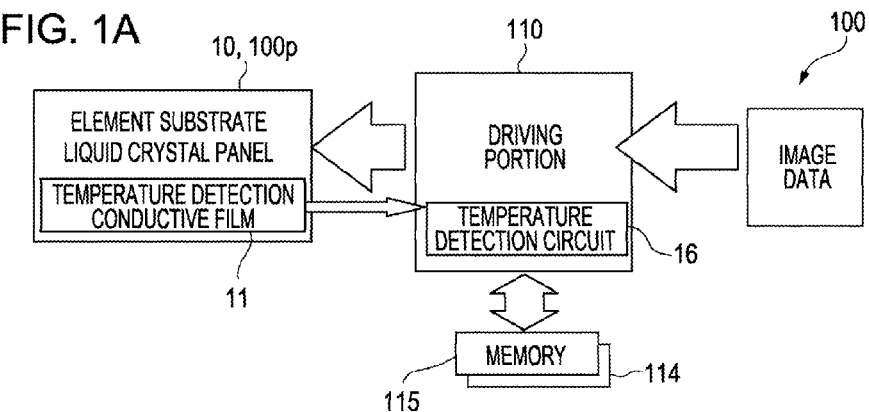
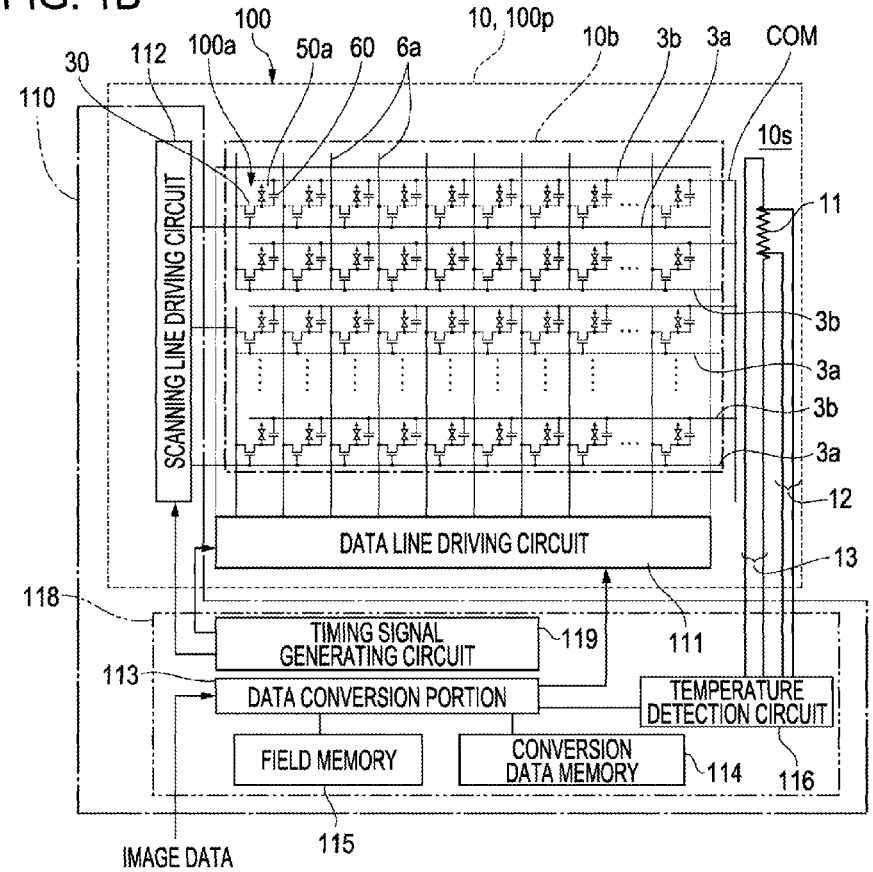

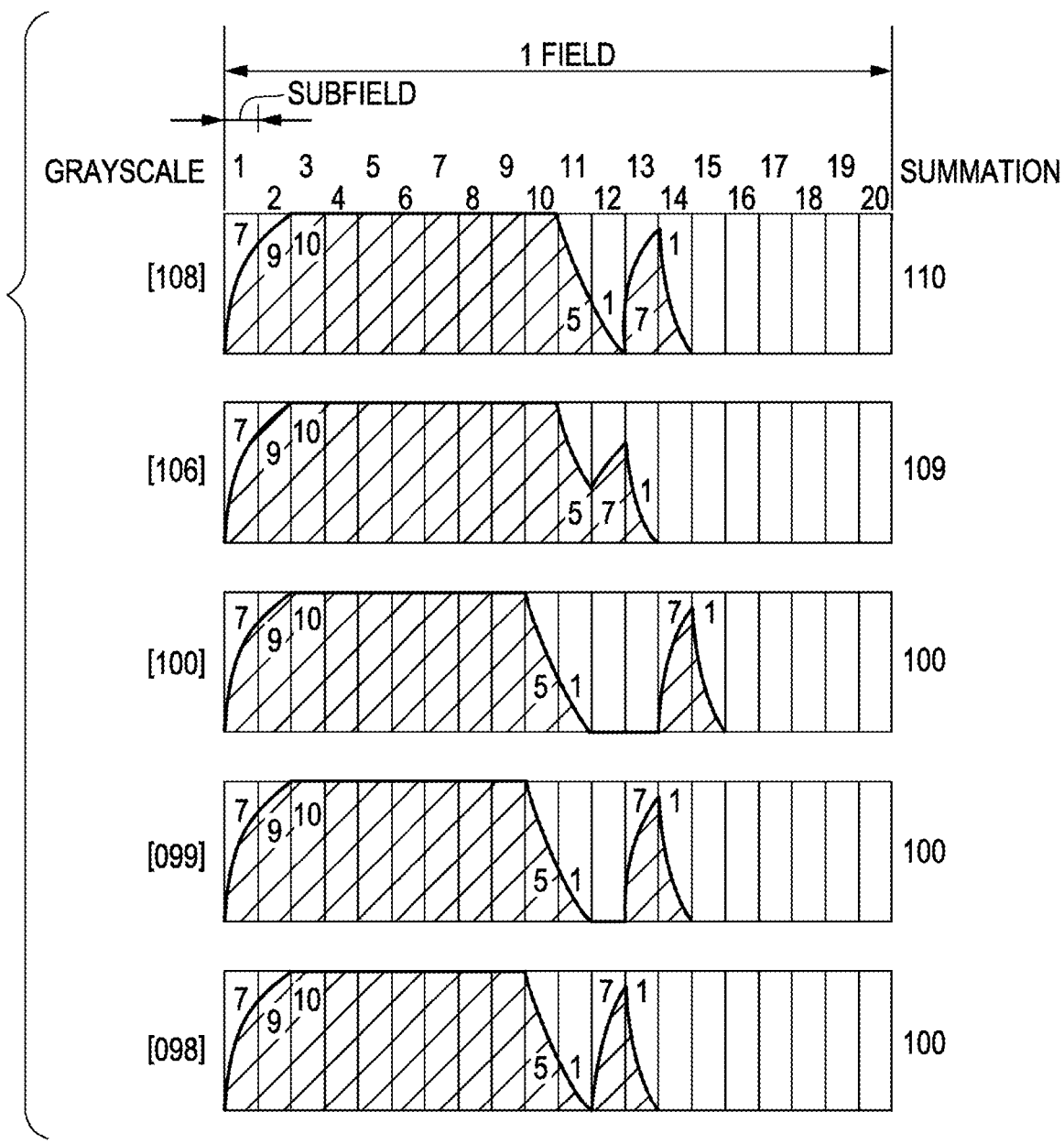

ELECTRO-OPTICAL DEVICE, ELECTRONIC APPARATUS AND PROJECTION DISPLAY DEVICE

Japanese Patent Application No. 2009-283742, filed Dec. 15, 2009 is incorporated by reference in its entirety herein.

BACKGROUND

1. Technical Field

The present invention relates to an electro-optical device for emitting a light modulated in a condition which is associated with an electrical signal, and an electronic apparatus and a projection display device including the electro-optical device.

2. Related Art

In a projection display device called a projector or the like, a liquid crystal device used as a light valve is constituted as an electro-optical device for emitting a light modulated in a condition which is associated with an electrical signal. Among the electro-optical devices, in a case of a transmissive liquid crystal device, a liquid crystal panel receives light entering from one surface, spatially modulates this light, and emits the modulated light from another surface. On the other hand, in a case of a reflective liquid crystal device, the liquid crystal panel receives light entering from one surface, spatially modulates this light, and emits the modulated light from another surface.

Generally, these liquid crystal panels use a quartz substrate as an element substrate, and have a structure forming field effect transistors or the like on this element substrate. A semiconductor layer which is a channel layer of the field effect transistor is formed using a method of crystallizing after depositing on the quartz substrate using a thin-film forming technique or a method using a substrate with a SOI structure attaching a single crystal silicon film on the quartz substrate. Since the latter uses a single crystal Si having a superior crystallinity, and the field effect transistor may be formed to have a high mobility and also few characteristic variations, and it is relatively easily possible to correspond to a circuit driving having a high driving frequency such as a multi-pixel, multi-gray scale, or digital driving. Also, since the former uses a single crystal Si having a superior crystallinity, a field effect transistor may be formed to have a high mobility and also little variability in characteristics.

The digital driving is a method for representing an intermediate gray scale by applying 0 V or 5 V to a liquid crystal layer at respective subfields obtained by dividing an image signal of one field (1/60 second) into a plurality of subfields (for example, refer to JP-A-2001-100180).

In the electro-optical device according to JP-A-2001-100180, a liquid crystal used as an electro-optical material changes response speed to a voltage according to temperature. Thereby, in the case of using the digital driving mode described above, if the temperature of the liquid crystal panel changes, it distorts the gradation property of a displayed image and causes occurrence of poor display. For example, if the temperature change in an atmosphere provided with the projection display device, or the amount of an illumination light supplied from a high brightness lamp to the liquid crystal device is adjusted using a diaphragm or the like depending on the displayed image, as the result of the occurrence of temperature change in the liquid crystal panel and a distortion of the gray scale, it is impossible to obtain a smooth display due to occurrence of a display unevenness or the like. On the other hand, if a temperature sensor is subsequently attached in the vicinity of the element substrate, there is a problem in that the liquid crystal temperature cannot be accurately monitored due to separation of the temperature sensor from the liquid crystal as well as cost increases.

SUMMARY

An advantage of some aspects of the invention is to provide an electro-optical device that can prevent occurrence of poor gray scale due to a temperature change, without subsequently attaching the temperature sensor in adopting a digital driving mode, and an electronic apparatus and a projection display device including the electro-optical device.

The invention includes an electro-optical device including an element substrate having a pixel having a pixel electrode for driving a liquid crystal and a field effect transistor for switching the pixel provided in correspondence with the pixel electrode, and a temperature detection conductive film formed by doping with an impurity in the same semiconductor layer as a semiconductor layer of the field effect transistor; and a driving portion for supplying a driving signal for displaying a gray scale to the pixel electrode, wherein the driving portion includes a data conversion portion for converting image data and generating, as the driving signal, a digital driving signal made of an ON-voltage in which the brightness of the pixel is saturated and an OFF-voltage in which the pixel becomes a light-off state in each of a plurality of subfields in which a field period is divided on a time axis, and the data conversion portion performs a correction corresponding to a change in resistance in the temperature detection conductive film when generating the digital driving signal.

In the invention, the driving portion converts the image data into the digital driving signal at the data conversion portion and supplies it to the pixel electrode. Herein, the digital driving signal is made of ON-voltage in which the brightness of the pixel saturates and OFF-voltage in which the pixel becomes light-off state in each of a plurality of subfields into which a field period is divided on a time axis, and performs a gray scale display through a balance of the period at which the ON-voltage is applied and the period in which the OFF-voltage is applied, or a timing at which the ON-voltage is applied. But, in the case of the digital driving mode, if the behavior of the liquid crystal upon application of the ON-voltage varies depending on the temperature, a distortion of the gray scale occurs, but in the invention, because the temperature detection conductive film is provided on the element substrate, in this temperature detection conductive film the resistance varies depending on the temperature. In addition, the data conversion portion performs a correction corresponding to a change in resistance in the temperature detection conductive film when generating the digital driving signal. Accordingly, since the correction corresponding to this temperature change is performed even though the temperature of the element substrate is changed, a distortion of the gray scale does not occur and the poor display does not occur. Furthermore, the temperature detection conductive film is a conductive film doped with an impurity in the semiconductor layer. This semiconductor layer of the conductive film can be simultaneously formed with a semiconductor layer of the field effect transistor for switching the pixel, and also can accurately monitor the temperature of the liquid crystal. Thus, according to the invention, it is possible to suppress distortion of the gray scale due to the temperature change without subsequently attaching the temperature sensor to the element substrate.

The invention is effectively adapted to a case where the data conversion portion generates, as the digital driving signal, a signal in which the ON-voltage discontinuously appears. In the case of this digital driving mode, the effect of applying the invention is significant to the extent that the gray scale display is performed by making maximum use of a transitional phenomenon of an orientation change of a liquid crystal and to the extent that it is easily affected by temperature change.

According to the invention, it is preferable to provide, on the element substrate, a wiring for applying an electric current electrically connected to each of two points separated in the longitudinal direction of the temperature detection conductive film, and a resistance detection wiring electrically connected to each of two points separated in the longitudinal direction of the temperature detection conductive film. According to this configuration, since the resistance can be monitored by a so-called four-terminal method, the resistance change can be accurately monitored, and thus it is possible to appropriately perform a temperature correction for the digital driving signal.

According to the invention, it is preferable that a plurality of the temperature detection conductive films is formed on the element substrate, and the plurality of the temperature detection conductive films is electrically connected in series by the wiring for applying an electric current. By constituting as such, since the temperature of the element substrate is monitored at a plurality of points, it is possible to appropriately perform the temperature correction for the digital driving signal.

According to the invention, it is preferable that the semiconductor layer is a polycrystalline silicon film. According to this configuration described above, unlike the single crystal silicon film or an amorphous silicon film, the resistance of the temperature detection conductive film is apparently changed followed by the temperature change therefore, the semiconductor layer constituting the temperature detection conductive film is appropriate for monitoring the temperature.

According to the invention, it is preferable that on the element substrate, a high thermal conductivity insulating film is continuously formed from a pixel portion on which a plurality of the pixels is arranged to a region on which the temperature detection conductive film is formed, wherein the high thermal conductivity insulating film has a higher thermal conductivity than an interlayer insulating film formed on the pixel portion. According to this configuration, since a temperature of the entire element substrate can be uniformized, even when the pixel and the temperature detection conductive film are separated, it is possible to accurately monitor the temperature of the pixel.

The electro-optical device according to the invention can be used in various electronic apparatuses, and in this case, the electro-optical device is used as a display unit of the electronics apparatus.

The electro-optical device according to the invention can be used in a projection display device (an electronic apparatus), and in this case, the projection display device includes a light source portion for supplying an illumination light to the electro-optical device, and a projection lens system that projects a modulated illumination light after the illumination light is modulated by the electro-optical device. In the case of the projection display device, since the illumination light of the high brightness from the light source portion is irradiated to the electro-optical device, the effect of the case according to the invention is significant to the extent that it is easy for the temperature change in the element substrate to occur.

BRIEF DESCRIPTION OF THE DRAWINGS

The invention will be described with reference to the accompanying drawings, wherein like numbers reference like elements.

FIGS. 1A and 1B are an explanatory view showing an overall configuration of a electro-optical device according to the invention.

FIG. 9 is an explanatory view upon increasing of temperature when performing a gray scale display by a digital driving in the electro-optical device according to the invention.

DESCRIPTION OF EXEMPLARY EMBODIMENTS

Figure 2A:
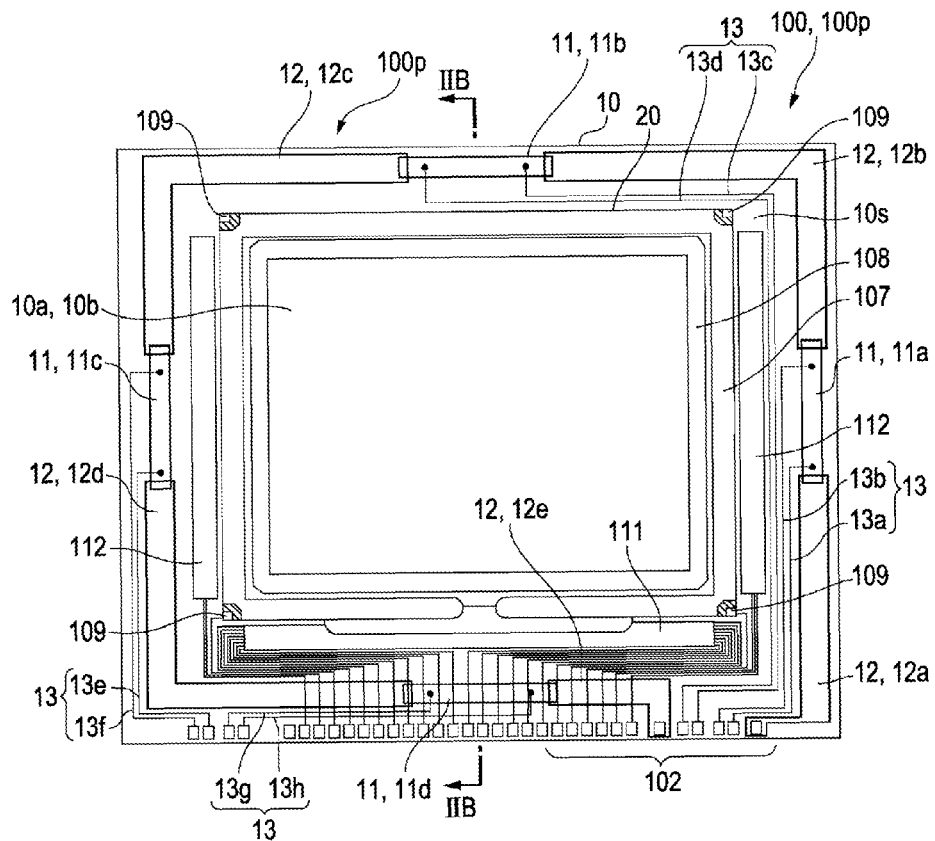
FIGS. 2A and 2B are an explanatory view showing a specific configuration of a liquid crystal panel used in the electro-optical device shown in FIGS. 1A and 1B.

Hereafter, embodiments of the invention will be described with reference to the drawings. Also, in drawings referred to hereafter in the description, to the extent that each layer or each member can be recognized in the drawings, each layer or each member is shown at different scales.

Configuration of Electro-Optical Device

Overall Configuration of Electro-Optical Device

FIGS. 1A and 1B are an explanatory view showing an overall configuration of an electro-optical device according to the invention and FIG. 1A is a block view schematically showing an electrical configuration of the electro-optical device, and FIG. 1B is a block view showing in detail the electrical configuration of the electro-optical device.

As shown in FIG. 1A, the electro-optical device of this embodiment is a liquid crystal device, and includes a liquid crystal panel 100*p*, and a driving portion 110 for driving the liquid crystal panel 100*p* based on image data supplied externally.

As shown in FIG. 1B, the liquid crystal panel 100p includes a pixel portion 10b in which a plurality of pixels 100a is arranged in the form of a matrix at the central region thereof. In this liquid crystal panel 100p, a plurality of data lines 6a and a plurality of scanning lines 3a are vertically and horizontally extended into the inside of the pixel portion 10b, and the pixels 100a are constituted at positions corresponding to the intersection of the data lines and the scanning lines in the element substrate 10 described below. In each of the plurality of pixels 100a, a pixel electrode 9a for driving the liquid crystal and a field effect transistor 30 for switching the pixel provided corresponding to the pixel electrode 9a are provided. The data lines 6a are electrically connected to a source of the field effect transistor 30, the scanning lines 3a are electrically connected to a gate of the field effect transistor 30, and the pixel electrode 9a is electrically connected to a drain of the field effect transistor 30. The pixel electrode 9a is opposite to a common electrode formed on a counter substrate to be described below by interposing the liquid crystal, and constitutes a liquid crystal capacitance 50a in each pixel electrode 100a. Also, in the each pixel electrode 100a, a holding capacitance 60 is added in parallel with the liquid crystal capacitance 50a in order to prevent an image signal held in the liquid crystal capacitance 50a from leaking. In this embodiment, in order to constitute the holding capacitance 60, the capacitance lines 3b are formed to be parallel with the scanning lines 3a, and the capacitance lines 3b are connected to the common potential lines and so are held at a common potential COM. In addition, the holding capacitance 60 may be formed between the front step scanning lines 3a.

The electro-optical device 100 of this embodiment adopts a digital driving mode to be described below, and a driving portion 110 generally includes a data line driving circuit 111 for driving the data lines 6a, a scanning line driving circuit 112 for driving the scanning lines 3a, a timing signal generating circuit 119 for generating a timing signal for supply to the scanning line driving circuit 112 and the data line driving circuit 111, and a data conversion portion 113 for converting image data into a digital driving signal for supply to the data line driving circuit 111. Also, the electro-optical device 100 includes a conversion data memory 114 for storing a piece of data when converting the image data into the digital driving signal, and a field memory 115 for temporarily storing the digital driving signal by one field. In the element substrate 10, the scanning driving line circuit 112 and the data line driving circuit 111 are provided at a peripheral region 10s corresponding to an outside of the pixel portion 10b. The data line driving circuit 111 is electrically connected to one end of each data line 6a, and sequentially supplies the digital driving signal supplied from the data conversion portion 113 to each data line 6a. The scanning line driving circuit 112 is electrically connected to each scanning line 3a, and sequentially supplies the scanning signal to each scanning line 3a.

The timing signal generation circuit 119, the data conversion portion 113, the conversion data memory 114, and the field memory 115 are constituted in a driving IC 118 mounted on a flexible wiring substrate (not shown) connected to the liquid crystal panel 100p.

In this electro-optical device 100 of the embodiment, firstly, a temperature detection conductive film 11, a wiring 12 for applying an electric current electrically connected to this temperature detection conductive film 11, and a resistance detection wiring 13 electrically connected to the temperature detection conductive film are provided in the peripheral region 10s of the element substrate 10 for the purpose of performing the temperature correction to be described below. Also, in the electro-optical device 100, the driving portion 110 performs the application of an electric current into the temperature detection conductive film 11 through the wiring 12 for applying an electric current and includes a temperature detection circuit 116 for monitoring the resistance of the temperature detection conductive film 11 through the resistance detection wiring 13 inside the driving IC 118, and a detection result of this temperature detection circuit 116 is output to the data conversion portion 113. Further, as described below, a piece of conversion data corresponding to each temperature is stored in the conversion data memory 114.

Detailed Configuration of Liquid Crystal Panel 100p

Figure 2B:
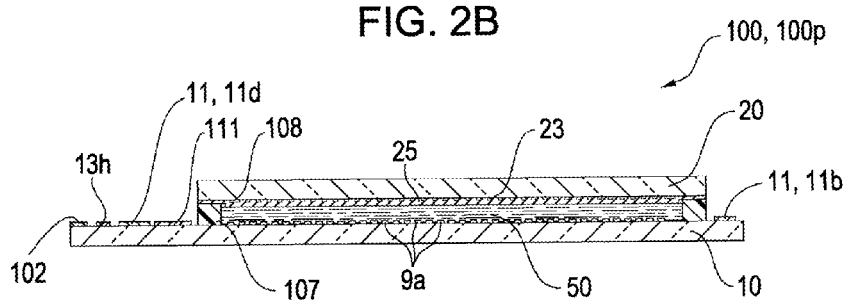

FIGS. 2A and 2B are an explanatory view showing a detailed configuration of a liquid crystal panel 100p used in the electro-optical device 100 shown in FIGS. 1A and 1B, FIG. 2A is a plan view of a liquid crystal panel 100p with other components viewed from a counter substrate side, and FIG. 2B is a cross-sectional view taken along the line IIB-IIB of FIG. 2A.

As shown in FIGS. 2A and 2B, in the liquid crystal panel 100p of the electro-optical device 100, the element substrate 10 and the counter substrate 20 are bonded together with a predetermined clearance using a sealant 107, which is disposed along the edge of the counter substrate 20. The sealant 107 is an adhesive made of a photo-curable resin or a thermosetting resin, and contains a gap material, such as glass fibers or glass beads, to secure a predetermined value for the distance between the element substrate and the counter substrate.

In the element substrate 10, an inside region of the sealant 107 is the pixel portion 10b, and an outside region of the sealant 107 is the peripheral region 10s. In the peripheral region 10s, the data line driving circuit 111 and a plurality of terminals 102 are formed along one side of the element substrate 10, and the scanning line driving circuit 112 is formed along the other side adjacent to the one side. A vertically conducting member 109 for electrically conducting between the element substrate 10 and the counter substrate 20 is formed in at least one of the corner portions of the counter substrate 20.

While details are described below, a matrix shaped pixel electrode 9a made of ITO (Indium Tin Oxide) film or the like is formed on the element substrate 10. On the other hand, a common electrode 25 made of ITO film or the like at a surface opposing the element substrate 10 is formed on the counter substrate 20. Also, on the counter substrate 20, a frame 108 made of a light-shielding material is formed in an inside region of the sealant 107, and the inside thereof is an image display region 10a. On the counter substrate 20, a light-shielding film 23 referred to as a black matrix or black stripes or the like is formed in a region opposing the vertical and horizontal boundary region of the image electrode 9a of the element substrate 10, and in this case, the common electrode 25 is formed in an upper layer side of the light-shielding film 23. Also, in the pixel portions 10b, a dummy pixel is constituted at a region overlapped with the frame 108, and in this case, among the pixel portions 10b, the region excluding the dummy pixel is used as the image display region 10a.

The electro-optical device 100 formed as described above may be used as a color display device of an electronic apparatus such as a mobile computer, a mobile phone, a liquid crystal television, a projection display device, and in this case, a color filter (not shown) or a protective film is formed on the counter substrate 20. Depending on the type of the liquid crystal 50 used, that is, the mode of operation, such as a twisted nematic (TN) mode, super twisted nematic (STN) mode, or a normally white mode/normally black mode, a polarizing film, a retardation film, a polarizer or the like is disposed in a predetermined direction on a plane of a light-incident side or a light-emitting side of the counter substrate 20 and the element substrate 10.

The electro-optical device 100 is not limited to a transmissive type, and may be constituted as a reflective type or semi-transmissive reflective type, and in this case, for example, a light-reflective layer formed of the pixel electrode 9a itself or a reflective layer different from the pixel electrode 9a is formed on the element substrate 10. The electro-optical device 100 can be used as a light valve for RGB in a projection display device (liquid crystal projector) described below. In this case, the lights of each color separated through a dichroic mirror for RGB color separation enter each electro-optical device 100 for RGB respectively as a projected light, and thus the color filter is not formed. Also, if a micro-lens is formed to correspond to each pixel with respect to the counter substrate 20, then a condensing efficiency for the pixel electrode 9a of the incident-light can be enhanced, and a bright display can be performed. Moreover, by depositing the interference layers having different refractive index from any layer on the counter substrate 20, a dichroic filter generating RGB color using the interference operation of light may be formed. According to the counter electrode having the dichroic filter, it is possible to display brighter colors.

Configuration of Each Pixel

Figure 3A:
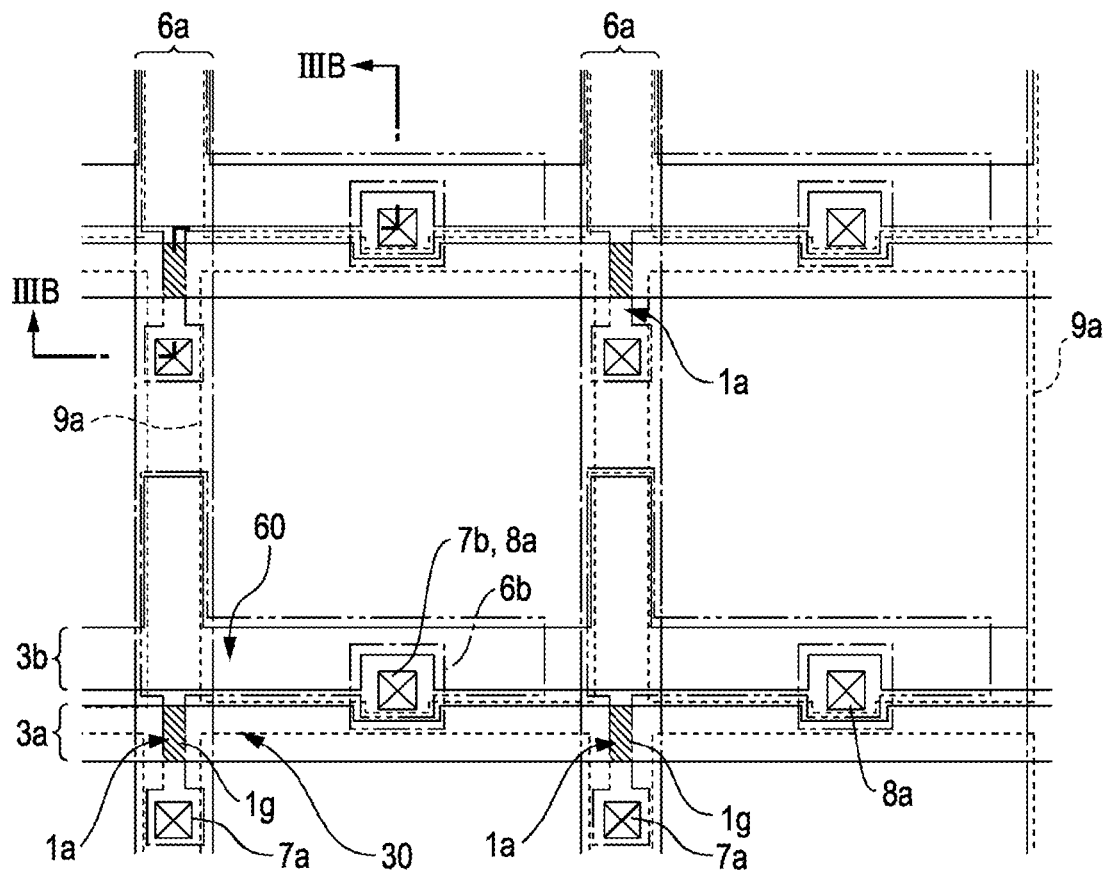
FIGS. 3A and 3B are an explanatory view showing a configuration of an element substrate used in the electro-optical device according to the invention.
Figure 3B:
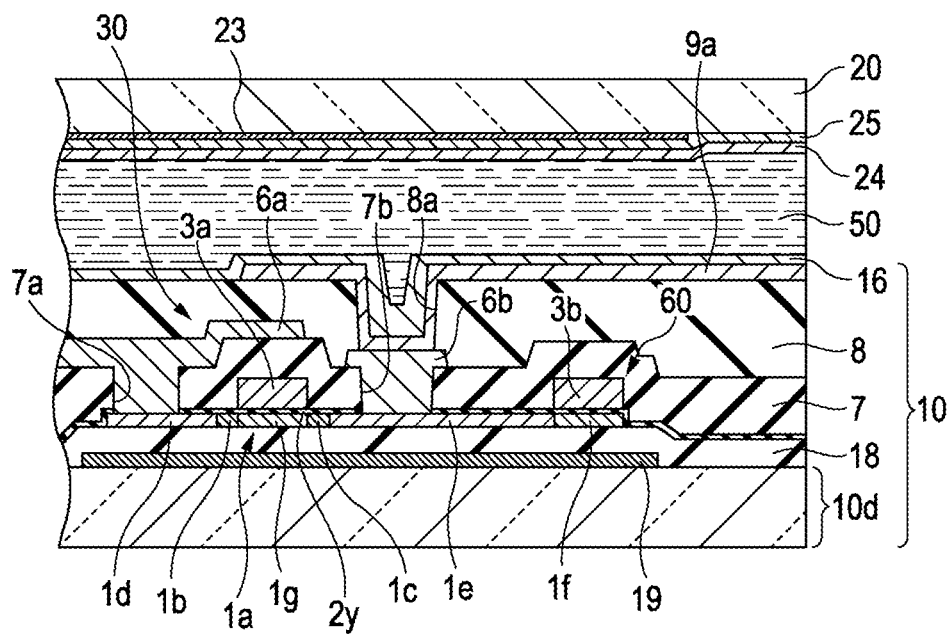

FIGS. 3A and 3B are an explanatory view showing a configuration of an element substrate 10 used in the electro-optical device 100 according to the invention, FIG. 3A is a plan view of adjacent pixels in the element substrate 10 used in the electro-optical device 100 according to the invention, and FIG. 3B is a cross-sectional view of the electro-optical device 100 taken along line IIIB-IIIB of FIG. 3B.

As shown in FIGS. 3A and 3B, on the element substrate 10, a light-shielding film 19 having a predetermined shape and a base insulating film 18 formed of a silicon oxide film or the like are formed on a surface of a translucent substrate 10d formed of a quartz substrate or a thermal-resistance glass substrate or the like, and on the surface side thereof, an N-type field effect transistor 30 is formed. The field effect transistor 30 includes LDD structure, which has a channel region 1g, a low-concentration source region 1b, a high-concentration source region 1d, a low-concentration drain region 1c, and a high-concentration drain region 1e with respect to the island-shaped semiconductor layers 1a formed of a polycrystalline silicon film or the like. A gate insulating layer 2 is formed on a surface side of the semiconductor layer 1a, and a gate electrode (scanning line 3a) is formed on the surface of the gate insulating layer 2. Further, the channel region 1g is channel-doped if necessary. Herein, a lower layer side of the semiconductor layer 1a of the field effect transistor 30 is provided with the light-shielding film 19, and thereby preventing a light from infiltrating into the semiconductor layer 1a. Accordingly, even when using a high brightness light source having a strong light intensity, it is possible to stably operate the field effect transistor 30 without the influence of the light.

Interlayer insulating films 7 and 8 made of the silicon oxide film are formed on the upper layer side of the field effect transistor 30. The data line 6a and a drain electrode 6b are formed on the surface of the interlayer insulating film 7, and the data line 6a is electrically connected to the high-concentration source region 1d through a contact hole 7a formed on the interlayer insulating film 7. Also, the drain electrode 6b is electrically connected to the high-concentration drain region 1e through a contact hole 7b formed on the interlayer insulating film 7. The pixel electrode 9a made of ITO film is formed on a surface of the interlayer insulating film 8. The pixel electrode 9a is electrically connected to the drain electrode 6b through a contact hole 8a formed on the interlayer insulating film 8. An orientation film 16 made of a polyimide film or inorganic orientation film is formed on a surface side of the pixel electrode 9a. The capacitance line 3b located at the same layer as the scanning line 3a opposes an extension portion 1f (lower electrode) from the high-concentration drain region 1e through an insulating layer (dielectric film) simultaneously formed with the gate insulating layer 2 as an upper electrode, thereby constituting the holding capacitor 60.

The element substrate 10 and the counter substrate 20 constituted as described above are disposed such that the pixel substrate 9a and the common electrode 25 face each other, and the liquid crystal 50 is filled in a space surrounded by the sealant 107 (see FIGS. 2A and 2B) between these substrates as the electro-optical material. The liquid crystal 50 is in a predetermined orientation state due to the orientation films 16 and 24 in a state in which an electric field from the pixel electrode 9a is not applied. The liquid crystal 50 is formed by mixing nematic liquid crystals of one kind or a plurality of kinds, for example.

Configuration for Temperature Detection

Figure 4A:
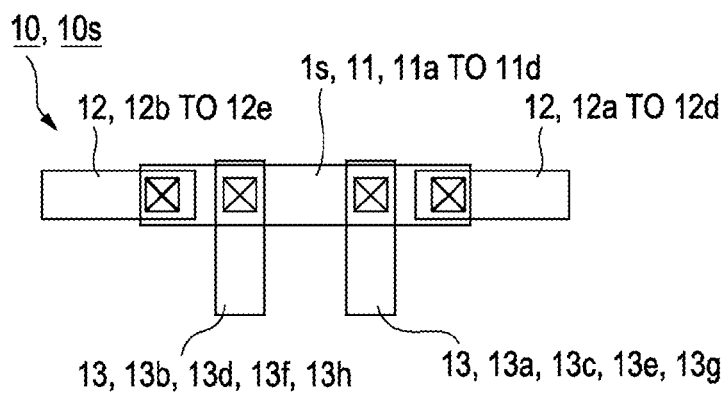
FIGS. 4A to 4C are an explanatory view of a temperature detection conductive film provided in the electro-optical device according to the invention.
Figure 4B:
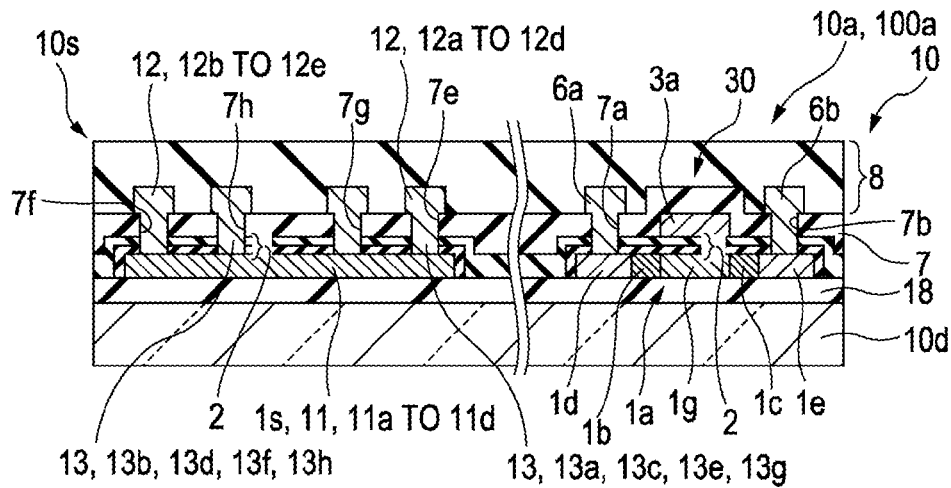
Figure 4C:
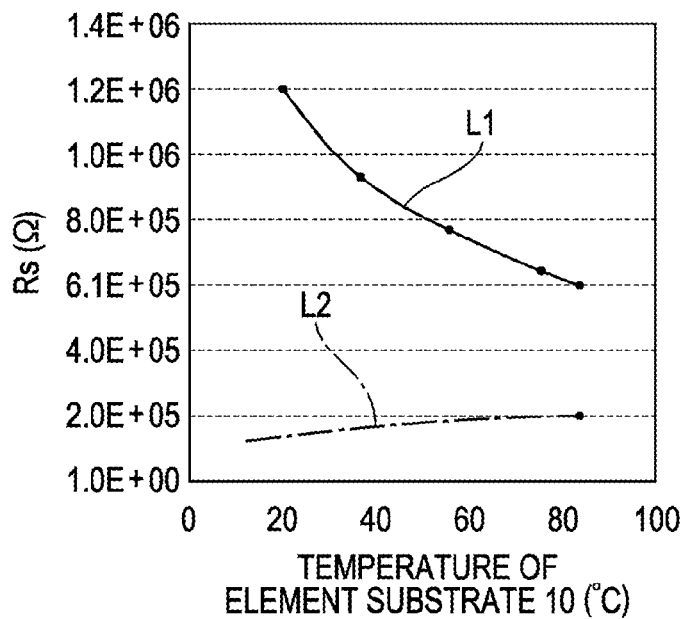

FIGS. 4A to 4C are an explanatory view of a temperature detection conductive film provided in the electro-optical device 100 according to the invention, FIG. 4A is a plan view of the temperature detection conductive film, FIG. 4B is a cross-sectional view of the temperature detection conductive film, and FIG. 4C is an explanatory view showing temperature characteristics of the temperature detection conductive film.

As shown in FIG. 2A, in the embodiment, the temperature detection conductive film 11 described with reference to FIG. 1B is constituted in the peripheral region 10s of the element substrate 10 as the four temperature detection conductive films 11a, 11b, 11c and 11d extending along each of the four sides of the element substrate 10, and the four temperature detection conductive films 11a, 11b, 11c and 11d are formed independently of each other. Herein, the temperature detection conductive film 11 is electrically connected to the wiring 12 for applying an electric current at each of two locations separated in the longitudinal direction, and the four temperature detection conductive films 11a, 11b, 11c and 11d are electrically connected in series by the wiring 12 for applying an electric current. More specifically, the wiring 12 for applying an electric current is formed of five wirings 12a to 12e for applying an electric current, the wirings 12a and 12b for applying an electric current are electrically connected to both ends of the temperature detection conductive film 11a, the wirings 12b and 12c for applying an electric current are electrically connected to both ends of the temperature detection conductive film 11b, the wirings 12c and 12d for applying an electric current are electrically connected to both ends of the temperature detection conductive film 11c, and the wirings 12d and 12e for applying an electric current are electrically connected to both ends of the temperature detection conductive film 11d. Also, the ends of the wirings 12a and 12e for applying an electric current are electrically connected to the terminal 102.

Also, the resistance detection wiring 13 is formed of eight resistance detection wirings 13a to 13h, and is electrically connected to each of two locations separated in the longitudinal direction inside the location in which the wiring 12 for applying an electric current is connected to the temperature detection conductive films 11a to 11d. More specifically, among the eight resistance detection wirings 13a to 13h, the resistance detection wirings 13a and 13b are electrically connected to the temperature detection conductive film 11a, the resistance detection wirings 13c and 13d are electrically connected to the temperature detection conductive film 11b, the resistance detection wirings 13e and 13f are electrically connected to the temperature detection conductive film 11c, and the resistance detection wirings 13g and 13h are electrically connected to the temperature detection conductive film 11d. Also, the ends of the resistance detection wirings 13a to 13h are electrically connected to the terminal 102.

As shown FIGS. 4A and 4B, the temperature detection conductive film 11 (temperature detection conductive films 11a to 11d) is a conductive film doped with an impurity in the same semiconductor layer is made of a polycrystalline silicon film as the semiconductor layer 1a constituting an active layer of the field effect transistor 30 for switching the pixel, and on the upper layer side thereof, the gate insulating layer 2 and the interlayer insulating films 7 and 8 are formed. Also, the wiring 12 for applying an electric current (wirings 12a to 12e for applying an electric current) and the resistance detection wiring 13 (resistance detection wirings 13a to 13h) formed simultaneously with the data line 6a or the drain electrode 6b shown in FIGS. 3A and 3B are formed in an interlayer of the interlayer insulating films 7 and 8. Also, contact holes 7e to 7h are formed in the gate insulating layer 2 and the interlayer insulating film 7, and the wiring 12 for applying an electric current (wirings 12a to 12e for applying an electric current) is electrically connected to the temperature detection conductive film 11 (temperature detection conductive films 11a to 11d) through the contact holes 7e and 7f. Also, the resistance detection wiring 13 (resistance detection wirings 13a to 13h) is electrically connected to the temperature detection conductive film 11 (temperature detection conductive films 11a to 11d) through the contact holes 7g and 7h.

The temperature detection conductive film 11 constituted as described above has the temperature characteristics shown by a solid line L1 in FIG. 4C at low impurity concentration, and a sheet resistance thereof may be reduced upon an increase in the temperature (the temperature of the element substrate 10). The temperature detection conductive film 11 has the temperature characteristics shown by a dashed line L2 in FIG. 4C at high impurity concentration, and the sheet resistance thereof may be increased upon an increase in the temperature (the temperature of the element substrate 10). In either case, because the sheet resistance of the temperature detection conductive film 11 changes depending to the temperature, it is possible to monitor the temperature of the element 10.

In the embodiment, the temperature detection conductive film 11 has an impurity concentration of $1 \times 10^{17}$ cm$^3$ or more and $4 \times 10^{18}$ cm$^3$ or less, and has the temperature characteristics shown by a solid line L1 in FIG. 4C due to a comparatively lower impurity concentration.

In the temperature detection conductive film 11 constituted as described above, a constant current I is applied through the wiring 12 for applying an electric current, and at this time, a potential difference (voltage) V is detected through the resistance detection wiring 13. For the ratio (V/I) of the V and the I, by multiplying the width dimension of the temperature detection conductive film 11, and the ratio of the distance of a connection location of two resistance detection wirings 13 and the temperature detection conductive film 11, it is possible to calculate the sheet resistance Rs of the temperature detection conductive film 11.

Further, due to a variation in the crystalline of the polycrystalline silicon film, a variation in the sheet resistance value exists between four temperature detection conductive films 11 (temperature detection conductive films 11a to 11d). Regarding this problem, the effects thereof can be excluded through calibration.

The temperature detection conductive film 11 has an advantage that a relatively large sheet resistance change can be obtained in relation to the temperature change since the impurity having the impurity concentration of $1 \times 10^{17}$ cm$^3$ to $4 \times 10^{18}$ cm$^3$ is doped on the semiconductor layer 1s made of polycrystalline silicon film. Since the polycrystalline silicon has a lot of defect levels in a silicon band gap unlike the single crystalline silicon, most of the carriers (electron or hole) are captured by the impurity injection, but the amount of the carriers that are free-carriers with the temperature change of the polycrystalline silicon film continuously changes. For the reason, it is possible to detect a relatively large sheet resistance change for the temperature change, and thus to accurately detect small changes from 5° C. to 10° C. as well. On the other hand, according to the temperature detection conductive films 11 of the embodiment of the invention, if the impurity concentration is too high, the sheet resistance becomes a small value, and thus the sheet resistance change for the temperature change decreases as well. Accordingly, it is difficult to accurately detect small changes from 5° C. to 10° C. Thus, it is preferable to have an impurity concentration of from $1 \times 10^{17}$ cm$^3$ to $4 \times 10^{18}$ cm$^3$ in the temperature detection conductive film 11.

Furthermore, since the temperature detection conductive film 11 is constituted as the four temperature detection conductive films 11a, 11b, 11c and 11d, it is possible to detect the temperature of the whole element substrate 10. Furthermore, since the four temperature detection conductive films 11a, 11b, 11c and 11d are electrically connected in series, even when providing the four temperature detection conductive films 11a, 11b, 11c and 11d, the minimum number of the wiring 12 for applying an electric current is completed. Accordingly, due to a small number of terminals 102, the flexible wiring substrate may have a small width dimension and may be inexpensive. Also, since the four temperature detection conductive films 11a, 11b, 11c and 11d are electrically connected in series, there is an advantage that the number of the wirings 12 for applying an electric current disposed around the peripheral region 10s may be small.

Explanation of Digital Driving Mode

Responsiveness of Liquid Crystal

Figure 5:
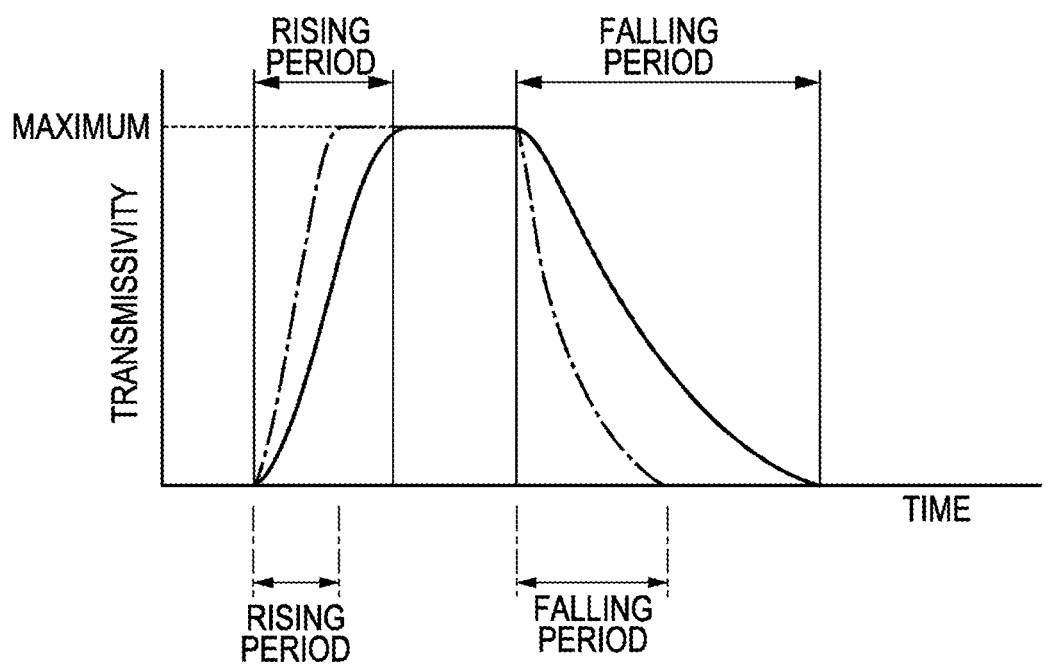
FIG. 5 is an explanatory view showing responsiveness of a liquid crystal used as an electro-optical material in the electro-optical device of the invention.

FIG. 5 is an explanatory view showing a responsiveness of a liquid crystal used as an electro-optical material in the electro-optical device 100 of the invention. As shown FIG. 5, since the liquid crystal used as the electro-optical material in the electro-optical device 100 exhibits transient phenomena, the brightness of the pixel reaches the maximum brightness with a predetermined time after applying the ON-voltage to the liquid crystal, and becomes the minimum brightness (light-off state) with a predetermined time after applying OFF-voltage. According to the embodiment of the invention, the digital driving mode is adopted using a subfield, which will be described with reference to FIG. 6 to FIG. 8 using this transitional phenomenon period.

Herein, a response speed at the time of rising and a response speed at the time of falling are expressed by a different equation. For example, the response speed $\tau r$ at the time of rising and the response speed $\tau d$ at the time of falling of the nematic liquid crystal of TN mode, GH mode, ECB mode or the like are expressed, respectively as following equation.

$$\tau r = \eta i d^2 / (\in 0 |\Delta \in| V^2 - kii\pi^2)$$

$$\tau d = \eta i d^2 / \pi^2 kii$$

ηi=viscosity parameter of liquid crystal
kii=elasticity parameter
Δ∈=permittivity parameter
V=applied voltage parameter As can be seen from the above equation, the response speed τr at the time of rising and the response speed τd at the time of falling are expressed by different equation, and the response speed τr at a rising time changes depending on the permittivity Δ∈ of the liquid crystal or the applied voltage V, and the response speed τd at the time of falling changes depending on these parameters.

In addition, the viscosity parameter ηi, the elasticity parameter kii, and the permittivity parameter Δ∈ change depending on the temperature, and thus a distortion of the gray scale described below with reference to FIG. 9 is generated. Thus, in the embodiment of the invention, a temperature correction is performed using a conversion piece of data for each temperature described below with reference to FIG. 6.

Digital Driving Method

Figure 6:
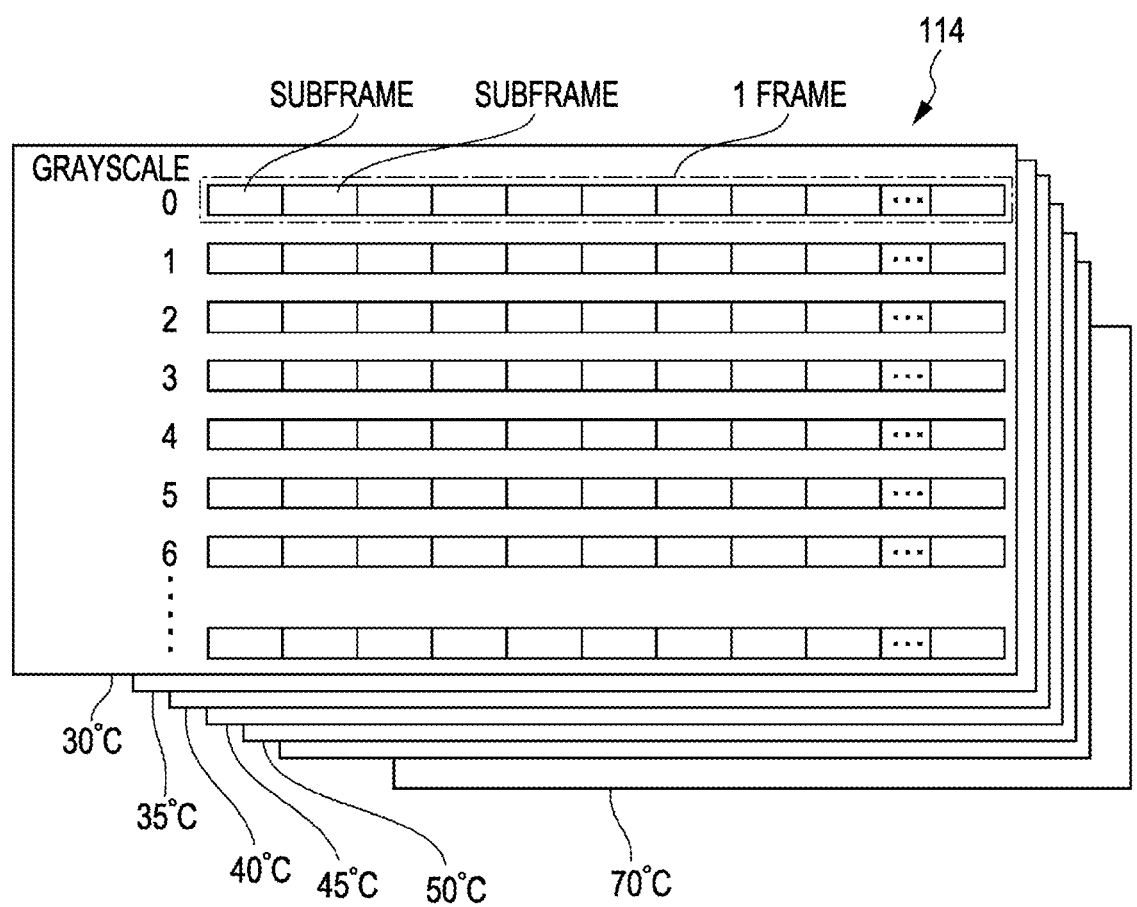
FIG. 6 is an explanatory view of a piece of data for conversion used in a data conversion to perform a digital driving in the electro-optical device according to the invention.
Figure 7:
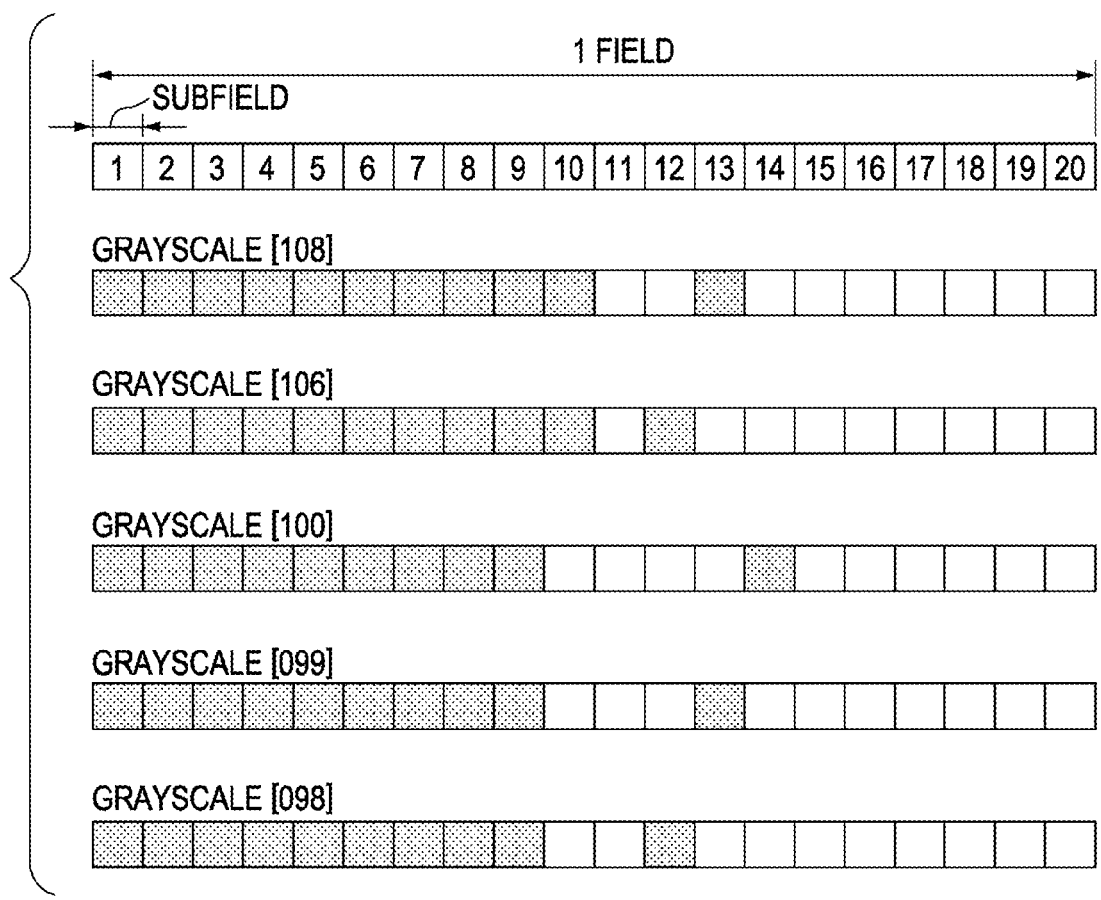
FIG. 7 is an explanatory view of a digital driving signal used in the electro-optical device according to the invention.
Figure 8:
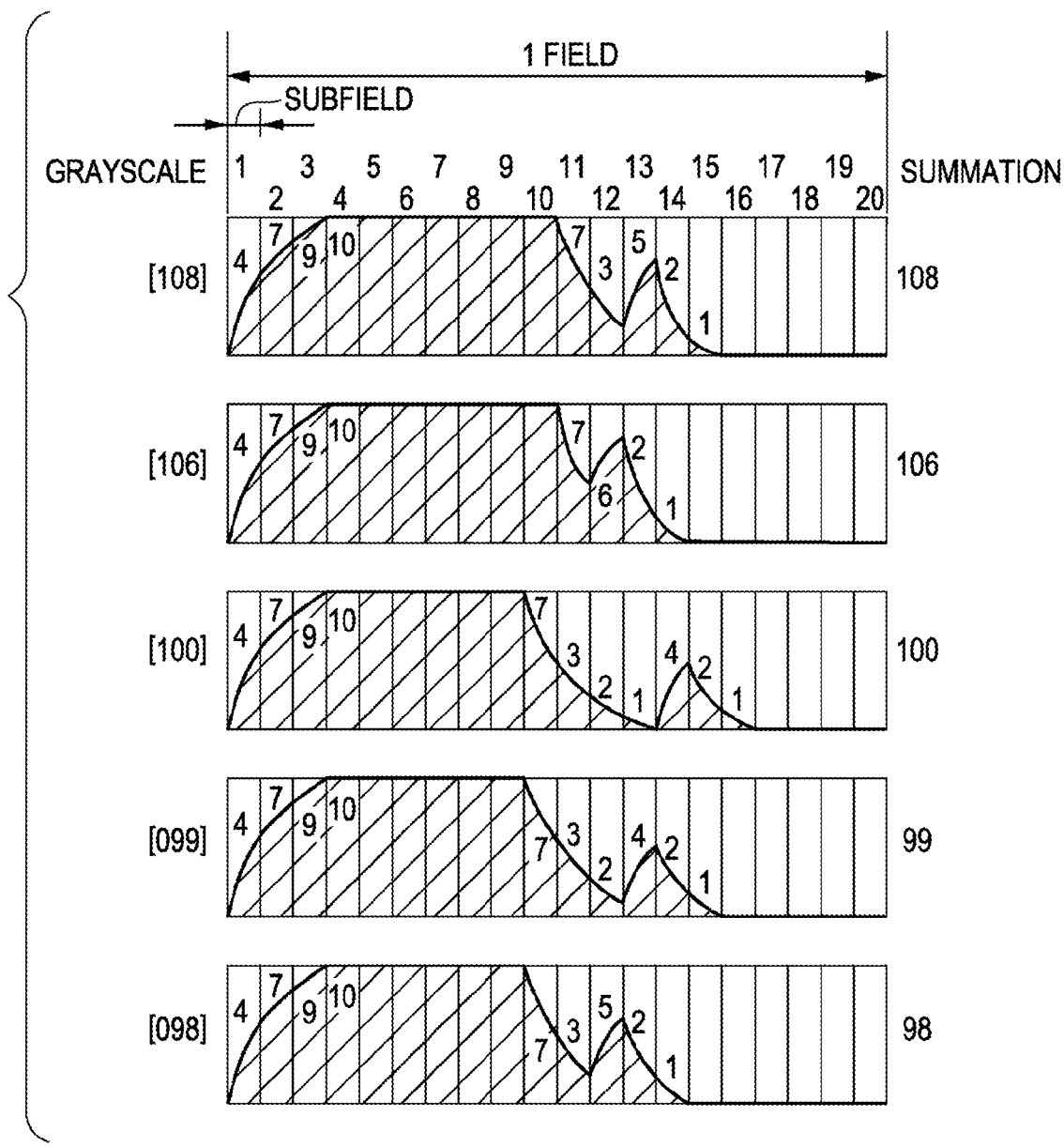
FIG. 8 is an explanatory view when performing a gray scale display by a digital driving in the electro-optical device according to the invention.

FIG. 6 is an explanatory view of a piece of data for conversion used in data conversion to perform a digital driving in the electro-optical device 100 according to the invention. FIG. 7 is an explanatory view of a digital driving signal used in the electro-optical device 100 according to the invention. FIG. 8 is an explanatory view when performing a gray scale display by a digital driving in the electro-optical device 100 according to the invention. Also, an oblique line is attached in the subfield in which an ON-voltage is applied in FIG. 7. Also, in FIG. 8 and FIG. 9 described below, an aspect is indicated in which the brightness of each pixel is changed based on the digital driving signal, a sum total of regions attaching the oblique line corresponds to the amount of light emitted in one field, that is, the brightness. Accordingly, in FIG. 8 and FIG. 9, the maximum brightness value for each subfield is indicated by 10, and a right edge indicates the sum total of brightness.

In the electro-optical device 100 of the embodiment, the data conversion portion 113 shown in FIG. 1B performs the gray scale display through the digital driving mode by converting the image data into the digital driving signal based on the conversion data stored in the conversion data memory 114 and supplying the digital driving signal to the data line driving circuit 111.

More specifically, as shown in FIG. 6 and FIG. 7, when dividing the field period into each of a plurality of subfields divided on the time axis, the emitting light amount is controlled and the gray scale display is performed in one-field period by applying the ON-voltage in which the brightness of the pixel is saturated to the pixel, or applying the OFF-voltage in which the pixel becomes the light-off state in each subfield. For this reason, the digital driving signal is formed of data in which the ON-voltage and the OFF-voltage are arranged in time series, and defines the balances of the period on which the ON-voltage is applied and the period on which the OFF-voltage is applied, or the timing on which the ON-voltage is applied or the like. For this reason, the conversion data stored in conversion data memory 114 is a piece of data defining the correspondence of the gray scale data and the digital driving signal corresponding to the gray scale data. The period of subfield is set shorter than application time when the voltage is applied to the liquid crystal, and when the voltage application is stopped.

Also, as shown in FIG. 7, in the embodiment of the invention, the data conversion portion 113 generates a signal in which the ON-voltage (subfield attaching the oblique line) discontinuously appears, as the digital driving signal. For example, in the digital driving signal shown in FIG. 7, in the case of gray scale "108", the ON-voltage is applied to the first to tenth subfields and thirteenth subfield, and in the case of gray scale "106", the ON-voltage is applied to the first to tenth subfields and twelfth subfield. In consequence, the amount of light emitted from the pixel becomes a value shown in FIG. 8 at each subfield, and the amount of emitted light (brightness) in one field is a sum total of the amount of emitted light in each subfield. For example, the brightness at the gray scale "108" becomes 108, and the brightness at the gray scale "106" becomes 106. In a similar way, in the digital driving signal shown in FIG. 7, in the case of gray scale "100", the ON-voltage is applied to the first to ninth subfields and fourteenth subfield, in the case of gray scale "099", the ON-voltage is applied to the first to ninth subfields and thirteenth subfield, and in the case of gray scale "098", the ON-voltage is applied to the first to ninth subfields and twelfth subfield. In consequence, the amount of light emitted from the pixel becomes a value shown in FIG. 8, the brightness at the gray scale "100" becomes 100, the brightness at the gray scale "099" becomes 99, and the brightness at the gray scale "098" becomes 98.

Temperature Correction

FIG. 9 is an explanatory view upon an increase in temperature when performing a gray scale display by a digital driving in the electro-optical device 100 according to the invention. In the case of adopting the digital driving mode described with reference to FIG. 6 to FIG. 8, if the temperature of the element substrate 10 of the electro-optical device 100 rises, the rising period and the falling period described with reference to FIG. 5 become short as shown by the dashed line in FIG. 5. In consequence, the amount of light emitted in the subfield described with reference to FIG. 8 changes as shown in FIG. 9. For example, the brightness of the case of gray scale "108" becomes 110, and the brightness of the case of gray scale "106" becomes 109. Also, the brightness of gray scales "100", "099", and "098" all become 100, and thus a distortion in the gray scales is generated.

Consequently, in the embodiment of the invention, as shown in FIG. 6, firstly, the conversion data in which the temperature corresponds to 30° C., 35° C., 40° C., 45° C., 50° C., . . . 70° C. are stored in the conversion data memory 114.

Also, in the electro-optical device 100, the temperature detection circuit 116 of the driving portion 110 shown in FIG. 1B includes a reference resistance (internal thermometer), for example, and at the time of startup, makes a comparison between this reference resistance and the resistance value of the current temperature detection conductive film 11, and performs the calibration. By performing this calibration, even when variation exists in the sheet resistance of the individual temperature detection conductive film 11, the effect of resistance variation can be excluded. Hereafter, the temperature detection circuit 116 detects the resistance value of the temperature detection conductive film 11, and monitors the temperature of the element substrate 10.

Next, in the case of the projection display device described below, when turning on the ramp, the illumination light is emitted to the liquid crystal panel 100p. Also, when inputting the image data, the data conversion portion 113 generates the digital driving signal based on the conversion data stored in the conversion data memory 114, and outputs to the data line driving circuit 111. Accordingly, each pixel 100a converts and emits the illumination light in a condition corresponding to the digital driving signal. Herein, since the conversion data in which the temperature corresponds to 30° C., 35° C., 40° C., 45° C., 50° C., . . . 70° C. are stored in the conversion data memory 114, the data conversion portion 113 generates the digital driving signal using the conversion data corresponding to the current temperature based on the temperature monitoring of the element substrate 10 by the temperature detection circuit 116, and outputs the digital driving signal to the data line driving circuit 111.

When displaying the image as such, for example, the emitting intensity of the illumination light from the lamp is changed based on the illuminance of environment light or the like. In consequence, since the intensity of illumination light irradiated to the liquid crystal panel 100p is changed, the temperature of the element substrate 10 changes. In this case as well, the data conversion portion 113 generates the digital driving signal using the conversion data corresponding to the current temperature based on the temperature monitoring of the element substrate 10 by the temperature detection circuit 116, and outputs the digital driving signal to the data line driving circuit 111. For this reason, even when the gray scale display is performed by the digital driving in the electro-optical device 100, distortion in the gray sale is not generated.

Manufacturing Method

FIGS. 10 and 11 are a process cross-sectional view showing a method for manufacturing an element substrate 10 among the manufacturing processes of the electro-optical device 100 according to the invention.

Figure 10A:
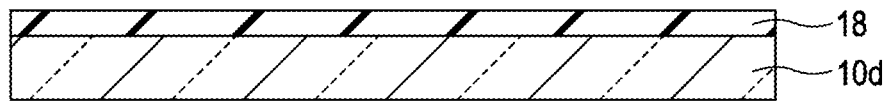
FIGS. 10A to 10F are a process cross-sectional view showing a method for manufacturing an element substrate among the manufacturing processes of the electro-optical device according to the invention.

In the embodiment of the invention, for manufacturing the element substrate 10, as shown in FIG. 10A, for example, a quartz substrate having a thickness of approximately 1.1 mm as the translucent substrate 10d is prepared. Next, after forming the light shielding film 19 (not shown in FIGS. 10 and 11) shown in FIG. 3B, for example, the silicon oxide film as the base insulating film 18 is deposited using a plasma CVD method.

Figure 10B:
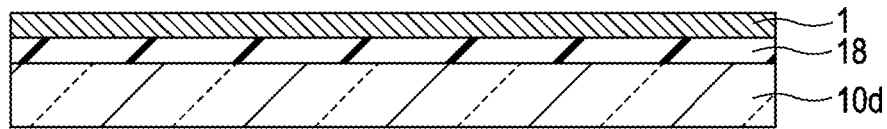

Then, as shown in FIG. 10B, a silicon film 1 as the semiconductor layer is deposited on whole surface of the base insulating film 18. The deposition method is a Low Pressure Chemical Vapor Deposition (LPCVD) or a plasma CVD method, and the thickness is approximately 50 nm to 70 nm.

Then a heat processing is performed at the temperature of approximately 600° C. to 700° C. in order to crystallize the silicon film 1. Here, processing for is performed four hours in a nitrogen atmosphere at the temperature of 640° C. and the silicon film 1 is polycrystallized. Also, then, it is preferable to perform the heat processing at the temperature of approximately 1000° C. to 1100° C. Hereby, crystallinity in the silicon film 1 is improved, and it is possible to form a better interface than a gate insulating layer described below.

Figure 10C:
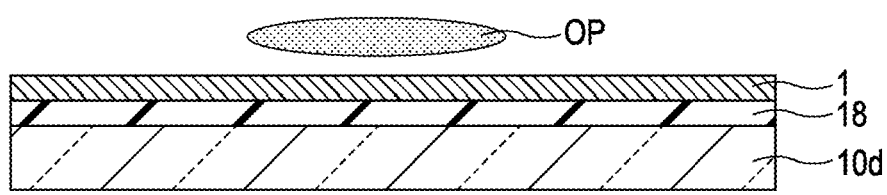

Then, as shown in FIG. 10C, irradiation of an Oxygen Plasma (OP) is performed for a polycrystallized silicon film 1. More specifically, the oxygen plasma (OP) is generated by oxygen gas supplied to the plasma generating device of parallel plate type, an oxygen ambient pressure of approximately 40 Pa to 100 Pa, and a RF power of approximately 400 W to 1500 W. In addition, the temperature of the translucent substrate 10d in which the silicon film 1 is deposited is approximately 150° C. to 400° C., and the plasma irradiation time is approximately 5 minutes to 20 minutes. This oxygen plasma irradiation acts on a defective portion of polycrystalline silicon film 1, and has an effect which is electrically almost inactivated.

Then, in order to remove the silicon oxide film formed on the surface of the silicon film 1 by the oxygen plasma irradiation, the silicon film 1 is placed in contact for approximately 30 seconds with a hydrofluoric acid aqueous solution diluted to 1 to 2%. By performing removal of this silicon oxide film, the silicon film 1 can be stably etched at the time of patterning the silicon film 1 in the next process, and also a good interface can be formed between the silicon film 1 and a gate insulating layer when forming the gate insulating layer by thermal oxidation described below.

Figure 10D:
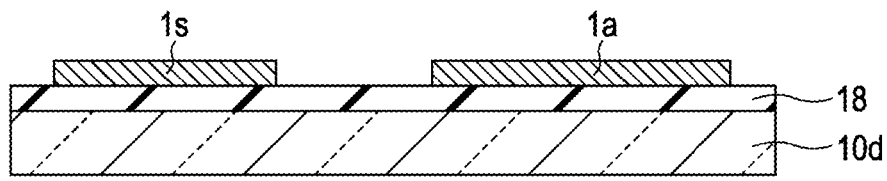

Then, a desired shape of photoresist film is formed by forming, exposing and developing (photolithography) the photoresist film on the silicon film 1. Then, the silicon film 1 is etched using the photoresist film as a mask. Then, if the remaining photoresist film is removed, as shown in FIG. 10D, the semiconductor layers 1a and 1s formed of island-shaped semiconductor layers are formed. A series of processing steps from the formation to removal of the photoresist film is called patterning.

Figure 10E:
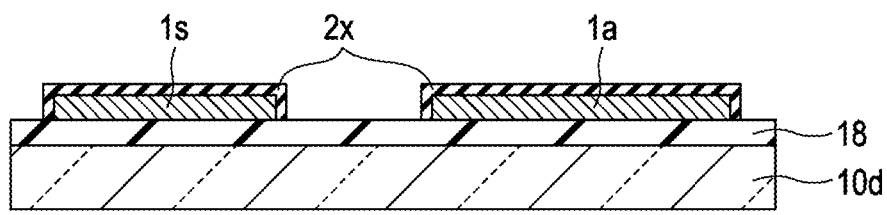

Then, as shown in FIG. 10E, for example, a silicon oxide film 2x as the gate insulating layer is formed on the semiconductor layers 1a and 1s. In the method of forming the silicon oxide film, a surface of the semiconductor layers 1a and 1s are oxidized at a temperature of approximately 800° C. to 1000° C., so as to form the thermal oxide film. With this method, a surface portion of the semiconductor layers 1a and 1s after removing the silicon oxide film by the hydrofluoric acid aqueous solution is satisfactorily oxidized, so that a good interface between the semiconductor layers 1a and 1s and the gate insulating layer 2 can be formed.

Figure 10F:
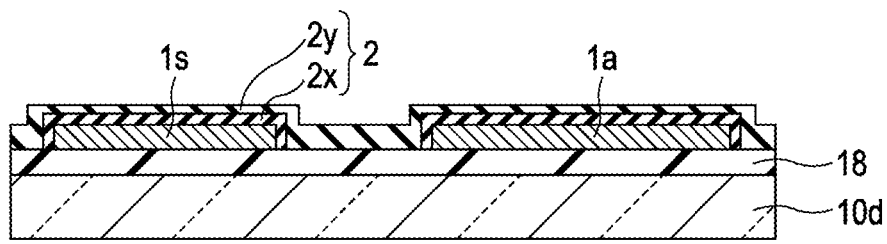

In the embodiment of the invention, as shown in FIG. 10F, in addition to the thermal oxidation processing, an silicon oxide film 2y is formed using a plasma CVD method or the like, and the gate insulating layer 2 is formed from the silicon oxide films 2x and 2y. When the polycrystalline silicon film is thermally oxidized for a long period of time, a number of convexes are formed on the surface of the silicon film, so that in some cases, the pressure resistance of the gate insulating layer 2 is lowered. Consequently, in the embodiment of the invention, by forming the gate insulating layer 2 by thermal oxidation process for a relatively short period of time, a good interface between the gate insulating layer 2 and the silicon film (semiconductor layers 1a and 1s) is formed and then the silicon oxide film 2y is deposited, so that the gate insulating layer 2 having a desired thickness is formed. In the embodiment of the invention, after the silicon oxide film 2x having a film thickness of approximately 10 nm is formed by thermal oxidation for approximately 10 minutes at 930° C., the silicon oxide film 2y having a film thickness of 15 nm is deposited using a CVD method, and the gate insulating layer 2 having a film thickness of 25 nm is formed.

Figure 11A:
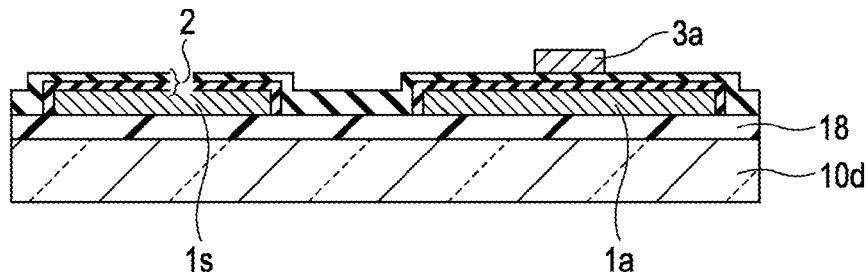
FIGS. 11A to 11D are a process cross-sectional view showing a method for manufacturing an element substrate among the manufacturing processes of the electro-optical device according to the invention.

Then, as shown in FIG. 11A, by depositing and patterning a conductive film on the gate insulating layer 2, the scanning line 3a (gate electrode) is formed. As a material of the conductive film, for example, an impurity-doped polycrystalline silicon or a metal such as Ta can be used, and these materials can form the conductive film by a CVD method or a sputtering method, for example. Also, at the time of forming the patterning of the scanning line 3a, the capacitance line 3b shown in FIGS. 1B and 3 forms the patterning as well.

Figure 11B:
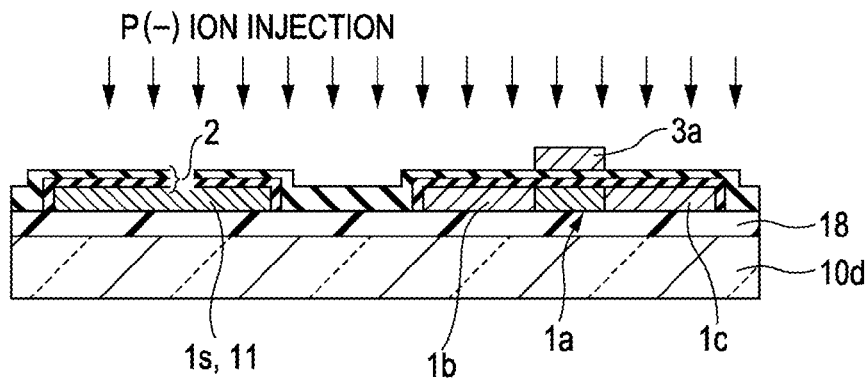

Then, as shown in FIG. 11B, an impurity is injected into the semiconductor layer 1a at both sides of the scanning line 3a while taking the scanning line 3a as a mask, so that low concentration impurity regions (low concentration source region 1b and low concentration drain region 1c) are formed. Herein, an impurity of phosphorous (P) or the like is injected at an impurity concentration of approximately $1 \times 10^{17}/cm^3$ to $4 \times 10^{18}/cm^3$. At this time, the impurity is injected into the semiconductor layer is as well, and as a result, the temperature detection conductive film 11 is formed.

Figure 11C:
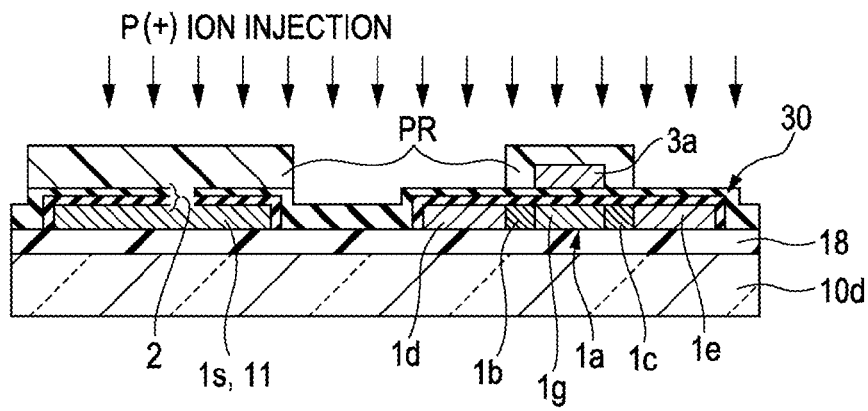

As shown in FIG. 11C, a resist mask PR is formed, and the impurity of the phosphorus (P) or the like is injected into the semiconductor layer 1a at the impurity concentration of $1 \times 10^{20}/cm^3$, so that a high concentration impurity regions (high concentration source region 1d and high concentration drain region 1e) are formed. At this time, the temperature detection conductive film 11 (semiconductor layer 1s) is masked by the resist mask PR, so that the impurity is not injected into the temperature detection conductive film.

Through the above processes, the N-type field effect transistor 30 having a lightly doped drain (LDD) is formed. Also, a channel region 1g is formed between the low concentration impurity regions (low concentration source region 1b and low concentration drain region 1c).

Figure 11D:
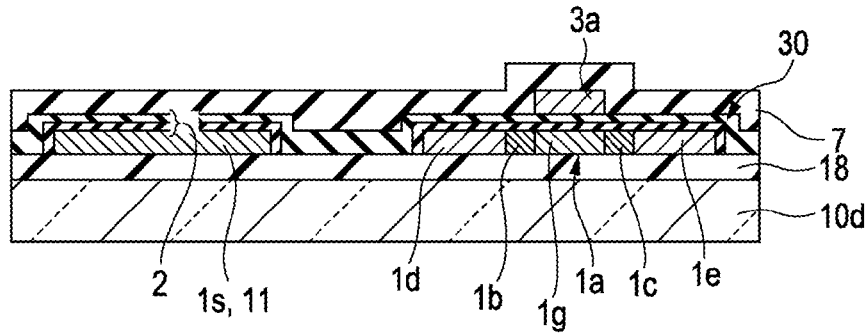

Then, as shown in FIG. 11D, for example, the silicon oxide film as the interlayer insulating film 7 is deposited on the scanning line 3a with a Plasma-Enhanced CVD (PECVD) for approximately 300 nm. Thereafter, for example, thermal processing is performed at approximately 850° C., so as to activate the impurity injected into the semiconductor layer 1a and the temperature detection conductive film 11 (semiconductor layer 1s).

Then, the interlayer insulating film 7 and the gate insulating layer 2 are etched in a state in which the resist mask (not shown) is formed on the surface of the interlayer insulating film 7, so that as shown in FIGS. 4A and 4B, the contact holes 7a, 7b, 7e, 7f, 7g and 7h are formed. Then, by depositing and patterning the conductive film on the interlayer insulating film 7, the data line 6a, the drain electrode 6b, the wiring 12 for applying an electric current, and the resistance detection wiring 13 are formed. The conductive film can be formed with the sputtering method or the like by using a metal such as aluminum (Al) or tungsten (W), or phosphorous-doped polycrystalline silicon. Subsequently, the interlayer insulating film 8 and the pixel electrode 9a shown in FIG. 3 are formed.

Also, in the method above, the temperature detection conductive film 11 is formed at the same time as the formation of the N-type field effect transistor 30, but if a p-type field effect transistor is formed on the element substrate 10, the impurity may be injected into the semiconductor layer 1s by the impurity injection process when forming this p-type field effect transistor.

Addition of High Thermal Conductivity Insulating Film

Figure 12A:
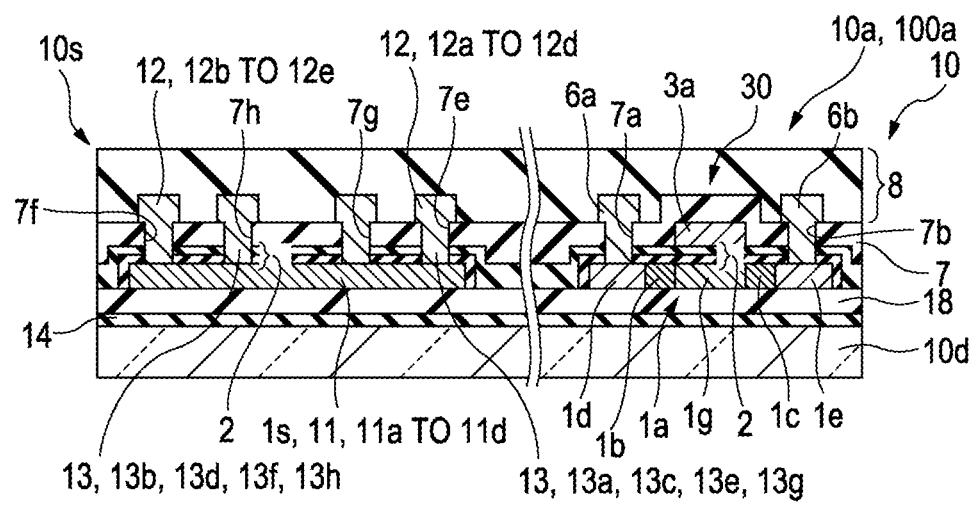
FIGS. 12A and 12B are an explanatory view of an embodiment for providing a high thermal conductivity insulating film for the temperature detection conductive film in the electro-optical device according to the invention.
Figure 12B:
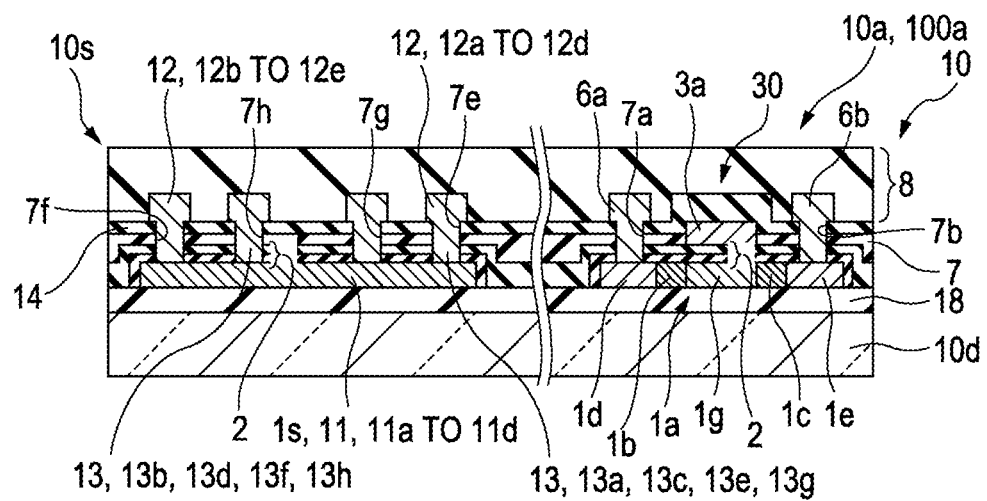

FIGS. 12A and 12B are an explanatory view of an embodiment for providing a high thermal conductivity insulating film for the temperature detection conductive film in the electro-optical device 100 according to the invention. Also, since the embodiment shown in FIGS. 12A and 12B is the embodiment adding the high thermal conductivity insulating film to the embodiment shown in FIG. 4B, the common portion is shown with the same numerals, and a detailed description thereof is omitted.

As shown in FIGS. 12A and 12B, in the element substrate 10 of the embodiment as well, the temperature detection conductive film 11 is formed on the peripheral region 10s in the same manner as the embodiment described with reference to FIG. 4B, and the wiring 12 for applying an electric current and the resistance detection wiring 13 are electrically connected to this temperature detection conductive film 11.

Herein, in the embodiment shown in FIG. 12A, the high thermal conductivity insulating film 14 made of a nitride aluminum film is formed between the base insulating film 18 and the translucent substrate 10d. The nitride aluminum film has a higher thermal conductivity than the interlayer insulating films 7 and 8 (silicon oxide film).

Also, as shown in FIG. 12B, the high thermal conductivity insulating film 14 made of a nitride aluminum film is formed between the interlayer insulating films 7 and 8, the wiring 12 for applying an electric current and the resistance detection wiring 13 are formed on the upper layer of the high thermal conductivity insulating film 14.

In the element substrate 10 constituted as described above, the high thermal conductivity insulating film 14 is continuously formed from the pixel portion 10b to the formation region of the temperature detection conductive film 11. Consequently, since the temperature of whole element substrate 10 is uniformized, even when the pixel 100a and the temperature detection conductive film 11 are separated, the temperature of the pixel 100a can be accurately monitored.

Main Effect of the Embodiment

As in the description above, in the electro-optical device 100 of the embodiment of the invention, the driving portion 110 converts the image data into the digital driving signal in the data conversion portion 113, and supplies the digital driving signal into the pixel electrode 9a via the data line driving circuit 111. Herein, the digital driving signal is made of an ON-voltage in which the brightness of the pixel 100a is saturated and an OFF-voltage in which the pixel 100a becomes a light-off state in each of a plurality of subfields in which a field period is divided on a time axis, and enables the digital driving performing the gray scale display with the balance between the period on which the ON-voltage is applied and the period on which the OFF-voltage is applied, or the timing on which the ON-voltage is applied, or the like.

In the case of adopting the digital driving mode as such, if the behavior of the liquid crystal 50 at the time of applying the ON-voltage changes depending on the temperature, distortion in the gray scale is generated. Particularly, the electro-optical device 100 of the embodiment of the invention is the liquid crystal device using the liquid crystal 50 as the electro-optical material, and the responsiveness of the orientation change is easily subject to the effect of temperature. However, in the embodiment, the temperature detection conductive film 11 is provided on the element substrate 10, so that the resistance of this temperature detection conductive film 11 changes depending on the temperature. Also, the data conversion portion 113 performs the correction corresponding to the change in resistance in the temperature detection conductive film 11 at the time of generating the digital driving signal. Consequently, even when the temperature of the element substrate 10 changes, because the correction corresponding to this temperature change is performed, the distortion in the gray scale is not generated, and a poor display is not generated.

Furthermore, the temperature detection conductive film 11 is the conductive film in which the impurity is doped into the semiconductor layer 1s made of the polycrystalline silicon film, and this semiconductor layer 1s may be formed simultaneously with the semiconductor layer 1a of the field effect transistor 30 for switching the pixel on the element substrate 10. Accordingly, with the embodiment of the invention, the temperature can be monitored without separately subsequently attaching the temperature sensor on the element substrate 10. Also, since the temperature detection conductive film 11 is formed on the element substrate 10, the temperatures of the element substrate 10 and the liquid crystal 50 can be accurately monitored. Therefore, since the temperature correction corresponding to the temperature of the liquid crystal 50 can be performed, the distortion of the gray scale due to the temperature change can be suppressed.

Also, in the embodiment, the data conversion portion 113 generates a signal in which the ON-voltage discontinuously appears, as the digital driving signal. In the case of this digital driving mode, in order to make maximum use a transitional phenomenon of an orientation change of a liquid crystal 50, the gray scale is subjected to the temperature effect, so that a large distortion of the gray scale is easily generated, but the distortion of the gray scale can be suppressed according to the embodiment of the invention.

Installation Examples in Electronic Apparatus

Figure 13A:
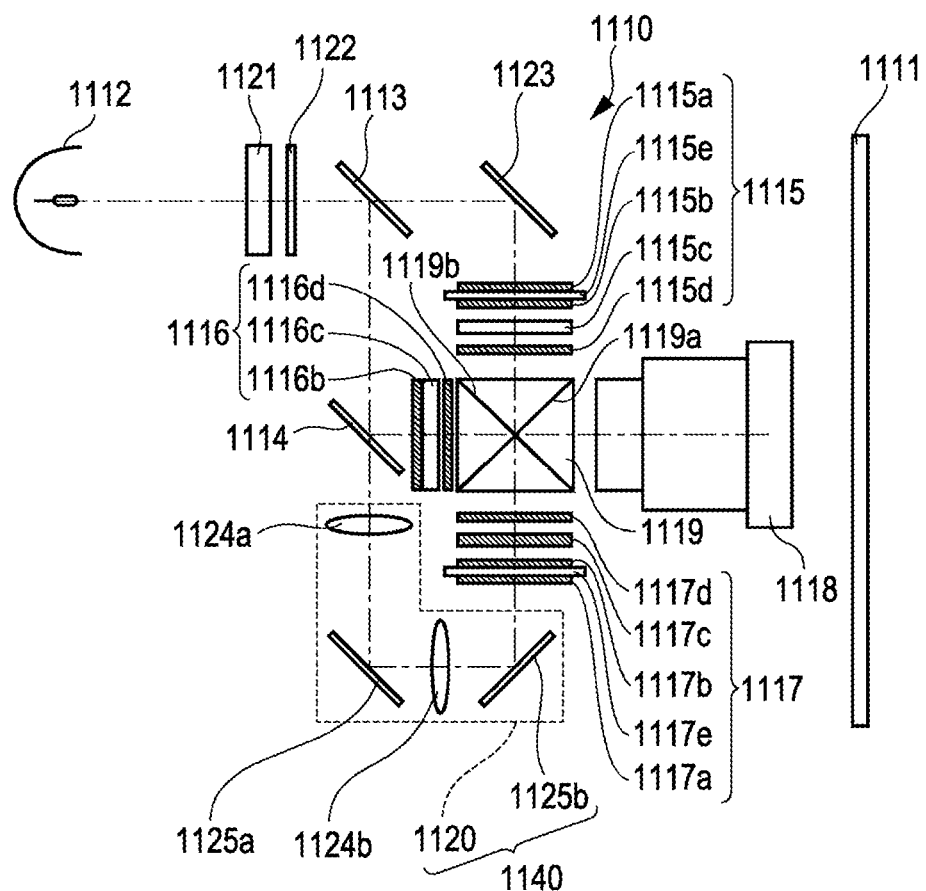
FIGS. 13A and 13B are an explanatory view of an electronic apparatus using the electro-optical device related to the invention.
Figure 13B:
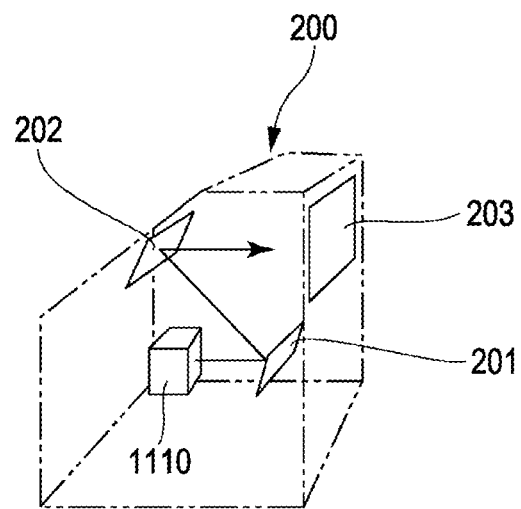

FIGS. 13 and 14 are an explanatory view of an electronic apparatus using the electro-optical device related to the invention. Firstly, in the case of constituting the electro-optical device 100 related to the invention as the projection liquid crystal device, the electro-optical device can be used as a light valve of the projection display device shown in FIG. 13A. Also, the projection display device shown in FIG. 13A can be used for a rear-type projector or the like shown in FIG. 13B.

A projection display device 1110 shown in FIG. 13A include a light source portion 1140 including a light source 1112, dichroic mirrors 1113 and 1114, and relay system 1120 or the like, a liquid crystal light valves 1115 to 1117 (transmissive electro-optical device 100), a cross dichroic prism 1119 (synthesizing optical system), and a projection optical system 1118.

The light source 1112 is constituted by an extra high pressure mercury lamp supplying light including a red light, a green light, and a blue light. The dichroic mirror 1113 is constituted to transmit red light from the light source 1112, and to reflect green light and blue light. Also, the dichroic mirror 1114 is constituted to transmit the blue light of the green light and the blue light reflected by the dichroic mirror 1113, and to reflect the green light. Consequently, the dichroic mirrors 1113 and 1114 constitute a color-separating optical system separating the light emitted from the light source 1112 into red light, green light, and blue light.

An integrator 1121 and a polarization conversion element 1122 are disposed between the dichroic mirror 1113 and the light source 1112 sequentially from the light source 1112. The integrator 1121 is constituted to uniformize the illuminance distribution of the light irradiated from the light source 1112. Also, the polarization conversion element 1122 is constituted to convert the light from the light source 1112 into a polarized light having a specific vibration direction such as s polarized light, for example.

The liquid crystal light valve 1115 is a transmissive electro-optical device modulating the red light transmitted by the dichroic mirror 1113 and reflected by a reflective mirror 1123 depending on an image signal. The liquid crystal light valve 1115 includes a λ/2 retardation plate 1115a, a first polarizing plate 1115b, a liquid crystal panel 1115c, and a second polarizing plate 1115d. Herein, the red light incident on the liquid crystal light valve 1115 remains s polarized light as the polarization of light is not changed while passing through the dichroic mirror 1113.

The λ/2 retardation plate 1115a is an optical element converting the s polarized light incident on the liquid crystal light valve 1115 into p polarized light. Also, the first polarizing plating 1115b is a polarizing plate blocking the s polarized light and transmitting the p polarized light. Then, the liquid panel 1115c is constituted to convert the p polarized light into s polarized light (circularly polarized light or elliptically polarized light in intermediate gray scale) by modulation depending on the image signal. Furthermore, the second polarizing plate 1115d is a polarizing plate blocking the p polarized light and transmitting the s polarized light. Accordingly, the liquid crystal light valve 1115 is constituted to modulate the red light depending on the image signal, and to emit the modulated red light to the cross dichroic prism 1119.

Also, the λ/2 retardation plate 1115a and the first polarizing plate 1115b are disposed in a state contacting a translucent glass plate 1115e without converting the polarized light, so that the λ/2 retardation plate 1115a and the first polarizing plate 1115b can avoid a distortion due to a heat generation.

The liquid crystal light valve 1116 is a transmissive electro-optical device modulating the green light reflected by the dichroic mirror 1113 and then reflected by the dichroic mirror 1114 depending on the image signal. Then, similarly to the liquid crystal light valve 1115, a liquid crystal light valve 1116 includes a first polarizing plate 1116b, a liquid crystal panel 1116c, and a second polarizing plate 1116d. The green light incident on the liquid crystal light valve 1116 is the s polarized light reflected and incident by the dichroic mirrors 1113 and 1114. The first polarizing plate 1116b is a polarizing plate blocking the p polarized light and transmitting the s polarized light. Also, the liquid panel 1116c is constituted to convert the s polarized light into p polarized light (circularly polarized light or elliptically polarized light in intermediate gray scale) by modulation depending on the image signal. Then, the second polarizing plate 1116d is a polarizing plate blocking the s polarized light and transmitting the p polarized light. Accordingly, the liquid crystal light valve 1116 is constituted to modulate the green light depending on the image signal, and to emit the modulated green light to the cross dichroic prism 1119.

The liquid crystal light valve 1117 is a transmissive electro-optical device modulating the blue light reflected by the dichroic mirror 1113, transmitted by the dichroic mirror 1114, and passing through the relay system 1120 depending on the image signal. Then, similarly to the liquid crystal light valves 1115 and 1116, a liquid crystal light valve 1117 includes a λ/2 retardation plate 1117a, a first polarizing plate 1117b, a liquid crystal panel 1117c, and a second polarizing plate 1117d. Herein, the blue light incident on the liquid crystal light valve 1117 is the s polarized light reflected by the dichroic mirror 1113, transmitted by the dichroic mirror 1114, and then reflected by the two reflective mirrors 1125a and 1125b of the relay system 1120 described below.

The λ/2 retardation plate 1117a is an optical element converting the s polarized light incident on the liquid crystal light valve 1117 into the p polarized light. Also, the first polarizing plate 1117b is a polarizing plate blocking the s polarized light and transmitting the p polarized light. Then, the liquid crystal panel 1117c is constituted to convert the p polarized light into s polarized light (circularly polarized light or elliptically polarized light in intermediate gray scale) by modulation depending on the image signal. Furthermore, the second polarizing plate 1117d is a polarizing plate blocking the p polarized light and transmitting the s polarized light. Accordingly, the liquid crystal light valve 1117 is constituted to modulate the blue light depending on the image signal, and to emit the modulated blue light to the cross dichroic prism 1119. Also, the λ/2 retardation plate 1117a and the first polarizing plate 1117b are disposed in state contacting a glass plate 1117e.

The relay system 1120 includes relay lenses 1124a and 1124b and reflective mirrors 1125a and 1125b. The relay lenses 1124a and 1124b are provided to prevent the loss of light due to the long optical path of the blue light. Herein, the relay lens 1124a is disposed between the dichroic mirror 1114 and the reflective mirror 1125a. Also, the relay lens 1124b is disposed between the reflective mirrors 1125a and 1125b. The reflective mirror 1125a disposed to reflect the blue light transmitted by the dichroic mirror 1114 and emitted from the relay lens 1124a to the relay lens 1124b. Also, the reflective mirror 1125b is disposed to reflect the blue light emitted from the relay lens 1124b to the liquid crystal light valve 1117.

The cross dichroic prism 1119 is a color-synthesizing optical system in which two dichroic films 1119a and 1119b are perpendicularly disposed in an X shape. The dichroic film 1119a is a film reflecting the blue light and transmitting the green light, and the dichroic film 1119b is a film reflecting the red light and transmitting the green light. Accordingly, the cross dichroic prism 1119 is constituted to synthesize the red light, the green light, and the blue light modulated by the liquid crystal light valves 1115 to 1117, respectively, and to emit the synthesized light to the projection optical system 1118.

Also, the light incident from the liquid crystal light valves 1115 and 1117 to the cross dichroic prism 1119 is the s polarized light, and the light incident from the liquid crystal light valve 1116 to the cross dichroic prism 1119 is the p polarized light. As such, the light incident on the cross dichroic prism 1119 is defined as different kinds of polarized lights, such that the light incident from each of the liquid crystal light valves 1115 to 1117 can be effectively synthesized in the cross dichroic prism 1119. Herein, generally, the dichroic films 1119a and 1119b are excellent in the reflective characteristics of the s polarized light. Consequently, the red light and the blue light reflected by the dichroic films 1119a and 1119b is the polarized light, and the green light transmitted by the dichroic films 1119a and 1119b is the p polarized light. The projection optical system 1118 has a projection lens (not shown), and is constituted to project the light synthesized by the cross dichroic prism 1119 to a screen 1111.

As shown in FIG. 13B, in the case of installing the projection display device 1110 on a rear-type projector 200, an image is displayed on a screen 203 by the reflecting mirrors 201 and 202. In the rear-type projector 200, since the light intensity supplied to the liquid crystal valves 1115, 1116 and 1117 is significantly high, the temperature changes of the liquid crystal valves 1115, 1116 and 1117 are large.

In the projection display device 1110 and the rear-type projector 200 constituted as such, the intensity of the illumination light emitted from the light source portion 1140 is changed depending on the illuminance of the environment light. In this case, the temperature of the electro-optical device 100 (liquid crystal light valves 1115, 1116, and 1117) is changed, but even when the temperature of the electro-optical device 100 (liquid crystal light valves 1115, 1116, and 1117) changes, the distortion of the gray scale can be prevented according to the invention.

Figure 14A:
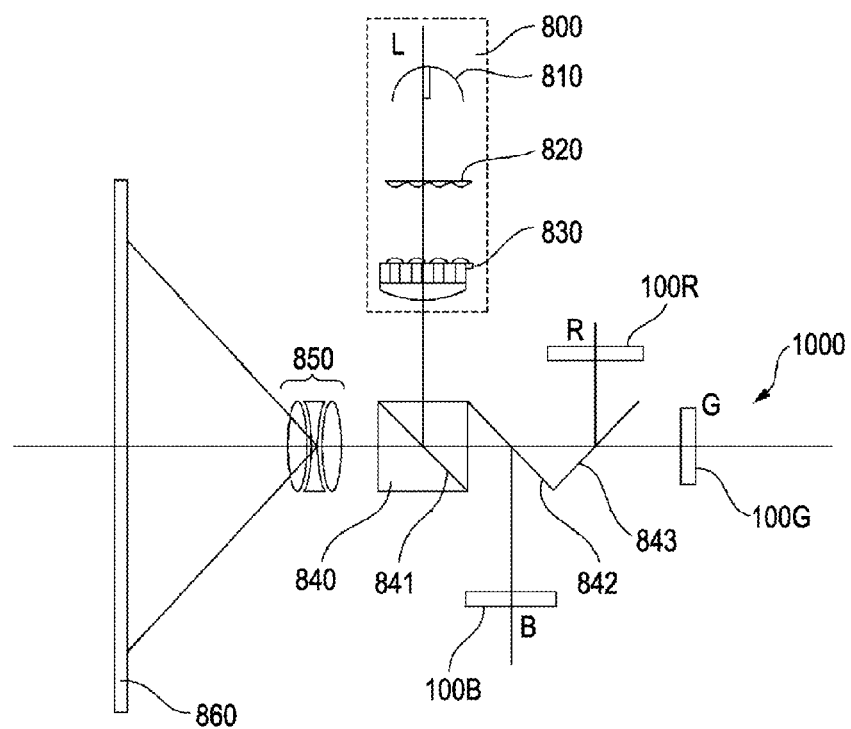
FIGS. 14A to 14C are an explanatory view of another electronic apparatus using the electro-optical device related to the invention.

Then, in the case of constituting the electro-optical device 100 related to the invention as the reflective liquid crystal device, it is possible to be used as the light valve of the projection display device shown in FIG. 14A. Also, the electro-optical device 100 related to the invention can be used as a direct view type display device shown in FIGS. 14B and 14C.

The projection display device 1000 has a polarized light illumination device 800 including a light source portion 810, an integrator lens 820 and a polarization conversion element 830 disposed along the system optical axis L; a polarizing beam splitter 840 reflecting an s polarized light flux emitted from the polarized light illumination device 800 by an s polarized light flux reflective surface 841; a dichroic mirror 842 for separating a component of a blue light (B) of the light reflected from the s polarized light flux reflective surface 841 of the polarizing beam splitter 840; and the dichroic mirror 843 for reflecting and separating a component of a red light (R) of light flux after the blue light is separated. Also, the projection display device 1000 includes three electro-optical devices 100 (reflective electro-optical device 100R, 100G, and 100B) in which each color light enters. In addition, the projection display device 1000 synthesizes the light modulated by three electro-optical device 100R, 100G, and 100B in the dichroic mirrors 842 and 843 and the polarizing beam splitter 840, and then projects the synthesized light to a screen 860 using a projection optical system 850.

In the projection display device 1000 constituted as such, the intensity of the illumination light emitted from the light source portion 810 is changed depending on the illuminance of the environment light. In this case, the temperature of the electro-optical device 100 (electro-optical device 100R, 100G, and 100B) is changed, but even when the temperature of the electro-optical device 100 (electro-optical device 100R, 100G, and 100B) changes, distortion of the gray scale can be prevented according to the invention.

Figure 14B:
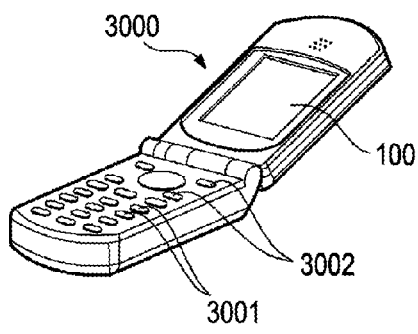

Also, a mobile phone 3000 shown in FIG. 14B includes a plurality of operation buttons 3001, a scroll buttons 3002, and an electro-optical device 100 as a display unit. By manipulating the scroll buttons 3002, the screen displayed in the electro-optical 100 is scrolled.

Figure 14C:
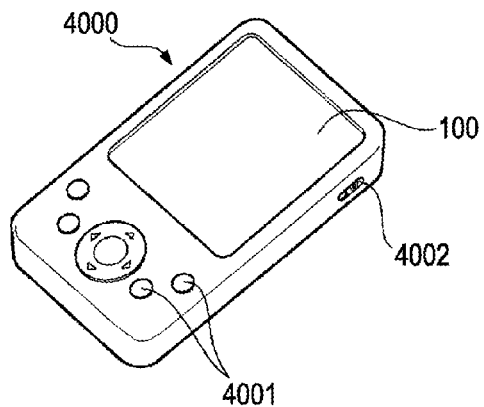

A personal digital assistant (PDA) 4000 shown in FIG. 14C includes a plurality of operation buttons 4001, a power switch 4002, and an electro-optical device 100 as a display unit, and when manipulating the power switch 4002, various pieces of information such as an address book or a schedule notebook are displayed on the electro-optical device 100.

What is claimed is:

1. An electro-optical device comprising:
an element substrate having a pixel including a pixel electrode for driving a liquid crystal, and a transistor for switching the pixel provided in correspondence with the pixel electrode, and a temperature detection conductive film formed by doping with an impurity in the same semiconductor layer as a semiconductor layer of the transistor; and
a driving portion for supplying a driving signal for displaying a gray scale to the pixel electrode,
wherein the driving portion includes a data conversion portion for converting image data and generating, as the driving signal, a digital driving signal made of an ON-voltage in which the brightness of the pixel is saturated and an OFF-voltage in which the pixel becomes a light-off state in each of a plurality of subfields in which a field period is divided on a time axis, and
the data conversion portion performs a correction corresponding to a change in resistance in the temperature detection conductive film when generating the digital driving signal,
wherein
the element substrate includes a wiring for applying an electric current electrically connected to each of two points separated in a longitudinal direction of the temperature detection conductive film,
a plurality of the temperature detection conductive films is formed on the element substrate, and
the plurality of the temperature detection conductive films is electrically connected in series by the wiring for applying an electric current.

2. The electro-optical device according to claim 1, wherein the data conversion portion generates a signal in which the ON-voltage discontinuously appears, as the digital driving signal.

3. The electro-optical device according to claim 1, wherein the element substrate further includes a resistance detection wiring electrically connected to each of two points separated in the longitudinal direction of the temperature detection conductive film.

4. The electro-optical device according to claim 1, wherein a width of the wiring for applying an electric current is wider than a width of the temperature detection conductive film.

5. The electro-optical device according to claim 1,
wherein the element substrate has a first side, a second side opposing to the first side, a third side, and a fourth side opposing to the third side,
the temperature detection conductive film is disposed along the first side of the element substrate, and
the wiring for applying an electric current has an L-shape along the first side and the third side.

6. The electro-optical device according to claim 1,
wherein the temperature detection conductive film includes a first temperature detection conductive film and a second temperature detection conductive film,
the element substrate includes a wiring for applying an electric current electrically connected between the first temperature detection conductive film and the second temperature detection conductive film, a first resistance detection wiring and a second resistance detection wiring electrically connected to each of two points separated in the longitudinal direction of the first temperature detection conductive film, a third resistance detection wiring and a fourth resistance detection wiring electrically connected to each of two points separated in the longitudinal direction of the second temperature detection conductive film, and a plurality of terminals disposed along one side of the element substrate,
the plurality of terminals includes a first terminal connected to the first resistance detection wiring, a second terminal connected to the second resistance detection wiring, a third terminal connected to the third resistance detection wiring, a fourth terminal connected to the fourth resistance detection wiring, and a first terminal group electrically connected to the driving portion, and
the first terminal group is disposed between the first terminal and the second terminal, and the third terminal and the fourth terminal.

7. The electro-optical device according to claim 1,
wherein the semiconductor layer is a polycrystalline silicon film.

8. The electro-optical device according to claim 1,
wherein on the element substrate, a high thermal conductivity insulating film is continuously formed from a pixel portion on which a plurality of the pixels is arranged to a region on which the temperature detection conductive film is formed, the high thermal conductivity insulating film having a higher thermal conductivity than an interlayer insulating film formed on the pixel portion.

9. An electronic apparatus comprising the electro-optical device according to claim 1.

10. A projection display device comprising the electro-optical device according to claim 1, comprising:
a light source portion for supplying an illumination light to the electro-optical device; and
a projection lens system that projects a modulated illumination light after the illumination light is modulated by the electro-optical device.

11. An electro-optical device comprising:
an element substrate having a pixel including a pixel electrode for driving a liquid crystal, and a transistor for switching the pixel provided in correspondence with the pixel electrode, and a temperature detection conductive film formed by doping with an impurity in the same semiconductor layer as a semiconductor layer of the transistor; and
a driving portion for supplying a driving signal for displaying a gray scale to the pixel electrode,
wherein
the driving portion includes a data conversion portion for converting image data and generating, as the driving signal, a digital driving signal made of an ON-voltage in which the brightness of the pixel is saturated and an OFF-voltage in which the pixel becomes a light-off state in each of a plurality of subfields in which a field period is divided on a time axis,
the data conversion portion performs a correction corresponding to a change in resistance in the temperature detection conductive film when generating the digital driving signal,
the element substrate has a first side, a second side opposing to the first side, a third side, and a fourth side opposing to the third side,
the temperature detection conductive film is disposed along the first side of the element substrate,
the element substrate includes a wiring for applying an electric current electrically connected to each of two points separated in a longitudinal direction of the temperature detection conductive film, and
the wiring for applying an electric current has an L-shape along the first side and the third side.

12. An electro-optical device comprising:
an element substrate having a pixel including a pixel electrode for driving a liquid crystal, and a transistor for switching the pixel provided in correspondence with the pixel electrode, and a temperature detection conductive film formed by doping with an impurity in the same semiconductor layer as a semiconductor layer of the transistor; and
a driving portion for supplying a driving signal for displaying a gray scale to the pixel electrode,
wherein
the driving portion includes a data conversion portion for converting image data and generating, as the driving signal, a digital driving signal made of an ON-voltage in which the brightness of the pixel is saturated and an OFF-voltage in which the pixel becomes a light-off state in each of a plurality of subfields in which a field period is divided on a time axis,
the data conversion portion performs a correction corresponding to a change in resistance in the temperature detection conductive film when generating the digital driving signal,
the temperature detection conductive film includes a first temperature detection conductive film and a second temperature detection conductive film,
the element substrate includes a wiring for applying an electric current electrically connected between the first temperature detection conductive film and the second temperature detection conductive film, a first resistance detection wiring and a second resistance detection wiring electrically connected to each of two points separated in the longitudinal direction of the first temperature detection conductive film, a third resistance detection wiring and a fourth resistance detection wiring electrically connected to each of two points separated in the longitudinal direction of the second temperature detection conductive film, and a plurality of terminals disposed along one side of the element substrate,
the plurality of terminals includes a first terminal connected to the first resistance detection wiring, a second terminal connected to the second resistance detection wiring, a third terminal connected to the third resistance detection wiring, a fourth terminal connected to the fourth resistance detection wiring, and a first terminal group electrically connected to the driving portion, and the first terminal group is disposed between the first terminal and the second terminal, and the third terminal and the fourth terminal.

13. An electro-optical device comprising:
a counter substrate;
a driving portion that supplies a driving signal;
an element substrate, the element substrate having:
   a pixel electrode;
   a transistor electrically connected to the pixel electrode; and
   a plurality of temperature detection conductive films, one of the plurality of temperature detection conductive films and another one of the plurality of temperature detection conductive films electrically connected in series,
wherein the driving signal is based on a resistance of at least one of the plurality of temperature detection films.

14. An electro-optical device comprising:
a counter substrate; and
an element substrate, the element substrate having:
   a pixel electrode;
   a transistor electrically connected to the pixel electrode;
   a first side, a second side opposing to the first side, a third side, and a fourth side opposing to the third side;
   a temperature detection conductive film disposed along the first side of the element substrate; and
   a wiring for applying an electric current to the temperature detection conducive film, the wiring for applying the electric current laving an L-shape along the first side and the third side.

15. An electro-optical device comprising:
a counter substrate; and
an element substrate, the element substrate having:
   a pixel electrode;
   a transistor electrically connected to the pixel electrode;
   a first temperature detection conductive film;
   a second temperature detection conductive film;
   a wiring for applying an electric current electrically connected between the first temperature detection conductive film and the second temperature detection conductive film;
   a first resistance detection wiring and a second resistance detection wiring electrically connected to each of two points separated in the longitudinal direction of the first temperature detection conductive film;
   a third resistance detection wiring and a fourth resistance detection wiring electrically connected to each of two points separated in the longitudinal direction of the second temperature detection conductive film; and
   a plurality of terminals disposed along one side of the element substrate; and
the plurality of terminals including a first terminal connected to the first resistance detection wiring, a second terminal connected to the second resistance detection wiring, a third terminal connected to the third resistance detection wiring, a fourth terminal connected to the fourth resistance detection wiring, and a first terminal group electrically connected to a driving portion; and
the first terminal group being disposed between the first terminal and the second terminal, and the third terminal and the fourth terminal.

16. The electro-optical device according to claim 13, wherein
the driving signal is based on a digital driving signal output from a data conversion portion of the driving portion, the digital driving signal being based on the resistance of the at least one of the plurality of temperature detection films.

* * * * *